United States Patent
Mihara et al.

(10) Patent No.: US 7,561,162 B2
(45) Date of Patent: *Jul. 14, 2009

(54) COMPUTER GRAPHICS DATA CODING APPARATUS, DECODING APPARATUS, CODING METHOD AND DECODING METHOD

(75) Inventors: Isao Mihara, Tokyo (JP); Yasuharu Takenaka, Kawasaki (JP); Takashi Takemoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/971,499

(22) Filed: Jan. 9, 2008

(65) Prior Publication Data

US 2008/0118166 A1 May 22, 2008

Related U.S. Application Data

(63) Continuation of application No. 11/234,289, filed on Sep. 26, 2005, now Pat. No. 7,339,583.

(30) Foreign Application Priority Data

Feb. 24, 2005 (JP) .............................. 2005-049409

(51) Int. Cl.
*G06T 15/00* (2006.01)
(52) U.S. Cl. ...................... 345/501; 341/59; 348/390.1; 375/240
(58) Field of Classification Search ................. 345/418, 345/420, 501, 502; 341/50, 59, 65; 348/390.1; 375/240, 240.02, 240.03, 240.12, 240.22, 375/240.26
See application file for complete search history.

(56) References Cited

U.S. PATENT DOCUMENTS 6,023,299 A 2/2000 Katata et al.

(Continued)

FOREIGN PATENT DOCUMENTS

JP 6-315143 11/1994

(Continued)

OTHER PUBLICATIONS

Michael Deering, "Geometry Compression", SIGGRAPH'95, 1995, pp. 13-20.

(Continued)

*Primary Examiner*—Phu K Nguyen
(74) *Attorney, Agent, or Firm*—Oblon, Spivak, McClelland, Maier & Neustadt, P.C.

(57) ABSTRACT

Computer graphics data coding apparatus includes unit configured to acquire computer graphics data items, unit configured to pre-process acquired computer graphics data items, controlling/coding unit configured to subject pre-processed computer graphics data items to process for controlling number of codes to be finally output, to generate codes, accumulation unit configured to accumulate parts to be subjected to entropy coding, which are contained in generated codes, calculation unit configured to calculate entropy information based on accumulated parts, and generate code words based on entropy information, entropy information indicating amount of entropy, entropy coding unit configured to subject generated codes to entropy coding based on generated code words, to generate entropy codes, extraction unit configured to extract, from entropy information, minimum information for decoding, extracted-information coding unit configured to code minimum information in order to reduce amount of minimum information, and output unit configured to output entropy codes and coded minimum information.

1 Claim, 12 Drawing Sheets

U.S. PATENT DOCUMENTS

| | | | |
|---|---|---|---|
| 6,420,980 B1 | 7/2002 | Ejima | |
| 6,834,081 B2 | 12/2004 | Kim et al. | |
| 6,947,874 B2 * | 9/2005 | Chen | 702/189 |
| 7,281,771 B1 * | 10/2007 | Wen et al. | 341/107 |
| 7,421,137 B2 * | 9/2008 | Taubman | 382/240 |
| 7,436,329 B2 * | 10/2008 | Lynch et al. | 341/51 |

FOREIGN PATENT DOCUMENTS

| | | |
|---|---|---|
| JP | 9-18350 | 1/1997 |
| JP | 2000-138933 | 5/2000 |

OTHER PUBLICATIONS

Kiyoshi Arai, "Foundation of Information Compression Techniques", Torikeps Corporation, No. 228, ISBN4-88657-228-6, Feb. 26, 2003, pp. 48-61 and 3 Cover Pages.

* cited by examiner

| Sz | Probability of generation |
|---|---|
| 0 | A (= "Number of generation of Sz=0" / number of data items) |
| 1 | B (= "Number of generation of Sz=1" / number of data items) |
| 2 | C (= "Number of generation of Sz=2" / number of data items) |
| .... | .... |
| 16 | D (= "Number of generation of Sz=16" / number of data items) |
| 17~30 | 0 |
| 31 (Normalized value (scale)) | E (= "Number of generation of scale" / number of data items) |

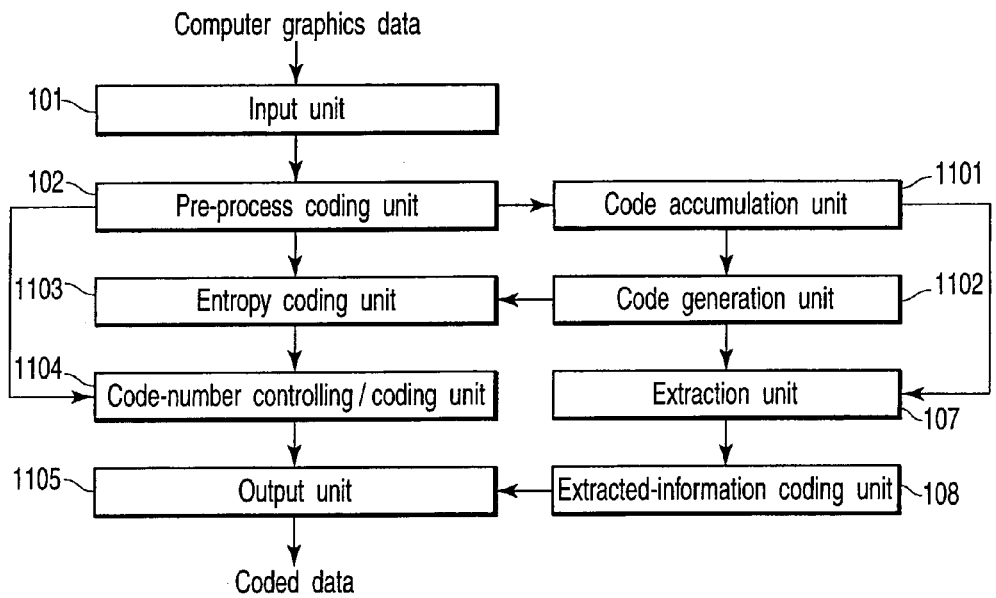
F I G. 1 1
| p | n1 | n2 | Sign of remaining one element |
|---|---|---|---|
| 000 | nx | ny | Positive |
| 001 | nx | ny | Negative |
| 010 | ny | nz | Positive |
| 011 | ny | nz | Negative |
| 100 | nx | nz | Positive |
| 101 | nx | nz | Negative |
F I G. 1 2

FIG. 13

Parameters in the case of two elements

| p | e1 | sign(e2) |
|---|----|----------|
| 00 | e1 | Positive |
| 01 | e1 | Negative |
| 10 | e2 | Positive |
| 11 | e2 | Negative |

Parameters (3 bits) in the case of two elements

| p | e1 | sign(e2) |
|---|----|----------|
| 000 | e1 | Positive |
| 001 | e1 | Negative |
| 010 | e2 | Positive |
| 011 | e2 | Negative |

Parameters in the case of four elements

| p | e1 | e2 | e3 | sign(e4) |
|---|----|----|----|----------|
| 000 | e1 | e2 | e3 | Positive |
| 001 | e1 | e2 | e3 | Negative |
| 010 | e1 | e2 | e4 | Positive |
| 011 | e1 | e2 | e4 | Negative |
| 100 | e1 | e3 | e4 | Positive |
| 101 | e1 | e3 | e4 | Negative |
| 110 | e2 | e3 | e4 | Positive |
| 111 | e2 | e3 | e4 | Negative |

| Sz | Index (frequency) |
|---|---|
| 0 | 4 (5th highest frequency of Sz) |
| 1 | 0 (Highest frequency of Sz) |
| 2 | 1 (2nd highest frequency of Sz) |
| .... | .... |
| 16 | 14 |
| 17~30 | N/A (unused) |
| 31 (Normalized value (scale)) | 31 |

| Index (frequency) | Huffman code word |
|---|---|
| 0 | 00 |
| 1 | 010 |
| 2 | 011 |
| .... | .... |
| 16 | 111111110 |

FIG. 16

| Index (frequency of Sz) | Huffman code |
|---|---|
| 0 (Highest frequency of Sz) | 0 |
| 1 (2nd highest frequency of Sz) | 10 |
| 2 (3rd highest frequency of Sz) | 1100 |
| 3 (Skip the rest) | 1101 |
| 4 | 1110 |
| 5 | 11110 |
| 6 | 111110 |
| 7 | 1111110 |
| 8 | 11111110 |
| 9 | 111111110 |
| 10 | 1111111110 |
| 11 | 11111111110 |
| 12 | 111111111110 |
| 13 | 1111111111110 |
| 14 | 11111111111110 |
| 15 | 111111111111110 |
| 16 | 1111111111111110 |

| Index (parameter) | Huffman code |
|---|---|
| 17~30 (Unused) | N / A |
| 31 (Normalized value (scale)) | 1111111111111111 |

FIG. 17

Method for conversion to (nx, ny, nz)

| p | nx | ny | nz |
|---|----|----|----|
| 000 | n1 | n2 | n3 |
| 001 | n1 | n2 | n3 |
| 010 | n3 | n1 | n2 |
| 011 | n3 | n1 | n2 |
| 100 | n1 | n3 | n2 |
| 101 | n1 | n3 | n2 |

| Huffman code table | | | Frequency table | |
|---|---|---|---|---|
| Huffman code | Index (frequency) | | Index (frequency) | Sz |
| 00 | 0 | | 0 | 15 |
| 010 | 1 | | 1 | 0 |
| 011 | 2 | → | 2 | 1 |
| .... | .... | | .... | .... |
| 111111110 | 16 | | 16 | 13 |

COMPUTER GRAPHICS DATA CODING APPARATUS, DECODING APPARATUS, CODING METHOD AND DECODING METHOD

CROSS-REFERENCE TO RELATED APPLICATIONS

The present continuation application claims the benefit of priority under 35 U.S.C. §120 to application Ser. No. 11/234,289, filed on Sep. 26, 2005, and under 35 U.S.C. §119 from Japanese Patent Application No. 2005-049409, filed Feb. 24, 2005, the entire contents of both are hereby incorporated herein by reference.

BACKGROUND OF THE INVENTION

1. Field of the Invention

The present invention relates to a data coding apparatus, coding method, decoding apparatus and decoding method for computer graphics.

2. Description of the Related Art

In accordance with recent enhancement in computer graphics techniques, the processing rate of graphics processing hardware (GPU) has been greatly increased. In general, data for graphics processing is stored in a storage medium, such as a memory or hard disk, and input therefrom to the GPU. Reading data from the storage medium and writing data thereto require time.

Accordingly, even if the processing speed of the GPU is increased, the time required for data reading and writing is a bottleneck in computer graphics processing.

To overcome this problem, various attempts have been made to increase the throughput of data access by compressing the amount of data needed for data access such as data reading or writing. For instance, the amount of data is compressed by Huffman coding (see, for example, Michael Deering, "Geometry Compression", International Conference on Computer Graphics and Interactive Techniques, Proceedings of the $22^{nd}$ Annual Conference on Computer Graphics and Interactive Techniques (SIGGRAPH'95), pp. 13-20, 1995).

In entropy coding represented by Huffman coding, however, the amount of entropy in data is used as information for generating code data, therefore, it is necessary to simultaneously use code data and information concerning the entropy used to acquire the code data. For instance, in Huffman coding, the frequency of generation of data is used for coding in which the higher the frequency of generation of data, the shorter the created code. Accordingly, codes of high compression efficiency can be acquired, but a table (generally called a Huffman table), for example, which indicates the correspondence between appearance frequency information used for coding and the resultant codes, must be used during decoding.

Namely, in the conventional coding method, it is necessary to simultaneously refer, during decoding, to code data and to the above-mentioned additional information (e.g., the Huffman table) in one way or another. At this time, the above-mentioned problem of cost of referring to the additional information becomes apparent.

In general, additional information is transferred together with data to a decoder and used to decode code words generated by an encoder. As mentioned above, since code words are generated using the amount of entropy in data, the content of additional information varies between data items. Therefore, the decoder dynamically decodes code words based on additional information corresponding to the code words. At this time, if much time is spent in decoding, the performance of the decoder is inevitably degraded. Namely, such decoding offsets the effect of compression coding performed for increasing the throughput.

It is desirable to minimize the time necessary for decoding. However, in the conventional method, it is necessary to dynamically decode code words, which requires a significant computation cost.

To overcome this problem, a method for statically decoding code words has also been contrived. In this method, all information necessary for decoding code words is attempted to be stored in a decoder. This attempt is made in, for example, a coding scheme standardized in a facsimile. Specifically, modified Huffman coding is utilized. This method, however, raises another problem. Namely, since the decoder prestores code words, the encoder must perform coding only within the range of the stored code words. For example, when the decoder stores N code words (N is a natural number), the encoder must select therefrom the one that realizes the highest compression efficiency.

Modified Huffman coding will not raise a significant problem in facsimile data that has a particular tendency. However, it may well cause a significant compression efficiency reduction in computer graphics data that does not show any particular tendency. Further, when a decoder stores all code words, it requires a large storage space. However, it is not practical in view of cost to prepare a large memory space as a memory that can be accessed at an extremely high speed. Therefore, reduction of access speed will inevitably be caused, resulting in a great reduction in throughput.

As described above, the conventional methods contain various problems as factors for reducing the throughput or increasing the costs. In general, decoders are often realized by hardware, such as GPUs, dedicated to graphics processing. The above-mentioned problems will increase 1) the costs in the time and circuit structure required for the preparation of decoding, and 2) the costs in the time and circuit structure for decoding. Accordingly, those problems directly lead to the reduction of the throughput and the increase of the price of the hardware.

In these years, GPUs have been installed in, as well as high-function machines, low-price machines, such as pachinko tables, car navigation systems, mobile phones, portable game machines, and mobile terminals. The above-mentioned increases in cost are serious problems in realizing a GPU installed in such inexpensive machines.

BRIEF SUMMARY OF THE INVENTION

In accordance with a first aspect of the invention, there is provided a computer graphics data coding apparatus comprising: an acquisition unit configured to acquire a plurality of computer graphics data items; a pre-process unit configured to pre-process the acquired computer graphics data items; a code-number controlling/coding unit configured to subject the pre-processed computer graphics data items to a process for controlling number of codes to be finally output, to generate a plurality of codes; an accumulation unit configured to accumulate a plurality of parts to be subjected to entropy coding, which are contained in the generated codes; a calculation unit configured to calculate entropy information based on the accumulated parts, and generate a plurality of code words based on the entropy information, the entropy information indicating an amount of entropy; an entropy coding unit configured to subject the generated codes to entropy coding based on the generated code words, to generate a plurality of entropy codes; an extraction unit configured to extract, from the entropy information, minimum information for decoding; an extracted-information coding unit configured to code the minimum information in order to reduce an amount of the minimum information; and an output unit configured to output the entropy codes and the coded minimum information.

In accordance with a second aspect of the invention, there is provided a computer graphics data coding apparatus comprising: an acquisition unit configured to acquire a plurality of computer graphics data items; a pre-process unit configured to pre-process the acquired computer graphics data items; an accumulation unit configured to accumulate the pre-processed computer graphics data items; a calculation unit configured to calculate entropy information based on a plurality of code parts of the accumulated computer graphics data items, and generate a plurality of code words based on the entropy information, the entropy information indicating an amount of entropy; an entropy coding unit configured to subject the accumulated computer graphics data items to entropy coding based on the generated code words, to generate a plurality of entropy codes; a code-number controlling/coding unit configured to subject the generated entropy codes to a process for controlling number of codes to be finally output, to generate a plurality of codes; an extraction unit configured to extract, from the entropy information, minimum information for decoding; an extracted-information coding unit configured to code the minimum information in order to reduce an amount of the minimum information; and an output unit configured to output the codes generated by the code-number controlling/coding unit, and the coded minimum information.

In accordance with a third aspect of the invention, there is provided a computer graphics data coding apparatus comprising: an acquisition unit configured to acquire a plurality of computer graphics data items; a pre-process unit configured to pre-process the acquired computer graphics data items; a code-number controlling/coding unit configured to subject the pre-processed computer graphics data items to a process for controlling number of codes to be finally output, to generate a plurality of codes; a code accumulation unit configured to accumulate first information indicating a relationship between a plurality of parts to be subjected to entropy coding, which are contained in the generated codes, and a frequency of generation of each of the parts; a code-word information accumulation unit configured to pre-accumulate second information indicating a relationship between entropy information and a plurality of first code words generated based on the entropy information, the entropy information indicating amounts of entropy of typical data; a code generation unit configured to generate a plurality of second code words corresponding to the generated codes, based on the accumulated first information and the pre-accumulated second information; an entropy coding unit configured to subject the generated codes to entropy coding based on the generated second code words, to generate a plurality of entropy codes; an extraction unit configured to extract minimum information for decoding from the accumulated first information and the pre-accumulated second information, based on the generated second code words; an extracted-information coding unit configured to code the minimum information in order to reduce an amount of the minimum information; and an output unit configured to output the entropy codes and the coded minimum information.

In accordance with a fourth aspect of the invention, there is provided a computer graphics data coding apparatus comprising: an acquisition unit configured to acquire a plurality of computer graphics data items; a pre-process unit configured to pre-process the acquired computer graphics data items; a code accumulation unit configured to accumulate first information indicating a relationship between a plurality of parts to be subjected to entropy coding, which are contained in the computer graphics data items performed in the pre-process, and a frequency of generation of each of the parts; a code-word information accumulation unit configured to pre-accumulate second information indicating a relationship between entropy information and a plurality of first code words generated based on the entropy information, the entropy information indicating amounts of entropy of typical data; a code generation unit configured to generate a plurality of second code words corresponding to the pre-processed computer graphics data items, based on the accumulated first information, and the pre-accumulated second information; an entropy coding unit configured to subject the pre-processed computer graphics data items to entropy coding based on the generated second code words, to generate a plurality of entropy codes; a code-number controlling/coding unit configured to subject the generated entropy codes to a process for controlling number of codes to be finally output, to generate a plurality of codes; an extraction unit configured to extract minimum information for decoding from the accumulated first information and the pre-accumulated second information, based on the generated second code words; an extracted-information coding unit configured to code the minimum information in order to reduce an amount of the minimum information; and an output unit configured to output the codes generated by the code-number controlling/coding unit, and the coded minimum information.

In accordance with a fifth aspect of the invention, there is provided a computer graphics data decoding apparatus for decoding a plurality of computer graphics data items coded by the computer graphics data coding apparatus as described in first or second aspect, the apparatus comprising: an acquisition unit configured to acquire the coded data items; an extracted-information decoding unit configured to decode the coded minimum information; a decode information generation unit configured to generate decode information used to acquire a plurality of decode words for decoding the code words, based on the decoded minimum information; an accumulation unit configured to accumulate the decode information; an entropy decoding unit configured to decode the entropy codes, using the decode information; a data decoding unit configured to decode the decoded entropy data into data present before the number of codes is controlled; a post-process decoding unit configured to decode the data, decoded by the data decoding unit, into the computer graphics data items before the pre-processed computer graphics data items, using an inverse process to a pre-process for pre-processing the acquired computer graphics data items; and an output unit configured to output the data acquired by the post-process decoding unit.

In accordance with a sixth aspect of the invention, there is provided a computer graphics data decoding apparatus for decoding a plurality of computer graphics data items coded by the computer graphics data coding apparatus as described in third or fourth aspect, the apparatus comprising: an acquisition unit configured to acquire the coded data items; an extracted-information decoding unit configured to decode the coded minimum information; a decode information generation unit configured to generate decode information indicating a relationship between the code words and a plurality of decode words corresponding to the code words, based on the decoded minimum information and the second information; a decode-information accumulation unit configured to accumulate the decode information; an entropy decoding unit configured to decode the entropy codes, using the decode information; a data decoding unit configured to decode the decoded entropy data into data present before the number of codes is controlled; a post-process decoding unit configured to decode the data, decoded by the data decoding unit, into the computer graphics data items before the pre-processed computer graphics data items, using an inverse process to a pre-process for pre-processing the acquired computer graphics data items; and an output unit configured to output the data decoded by the post-process decoding unit.

In accordance with a seventh aspect of the invention, there is provided a computer graphics data coding method comprising: acquiring a plurality of computer graphics data items; pre-processing on the acquired computer graphics data items; subjecting the pre-processed computer graphics data items to a process for controlling number of codes to be finally output, to generate a plurality of codes; accumulating a plurality of parts to be subjected to entropy coding, which are contained in the generated codes; calculating entropy information based on the accumulated parts, and generating a plurality of code words based on the entropy information, the entropy information indicating an amount of entropy; subjecting the generated codes to entropy coding based on the generated code words, to generate a plurality of entropy codes; extracting, from the entropy information, minimum information for decoding; coding the minimum information in order to reduce an amount of the minimum information; and outputting the entropy codes and the coded minimum information.

In accordance with an eighth aspect of the invention, there is provided a computer graphics data coding method comprising: acquiring a plurality of computer graphics data items; pre-processing the acquired computer graphics data items; accumulating the pre-processed computer graphics data items; calculating entropy information based on a plurality of code parts of the accumulated computer graphics data items, and generating a plurality of code words based on the entropy information, the entropy information indicating an amount of entropy; subjecting the accumulated computer graphics data items to entropy coding based on the generated code words, to generate a plurality of entropy codes; subjecting the generated entropy codes to a process for controlling number of codes to be finally output, to generate a plurality of codes; extracting, from the entropy information, minimum information for decoding; coding the minimum information in order to reduce an amount of the minimum information; and outputting the codes generated by the process, and the coded minimum information.

In accordance with a ninth aspect of the invention, there is provided a computer graphics data coding method comprising: acquiring a plurality of computer graphics data items; pre-processing the acquired computer graphics data items; subjecting the pre-processed computer graphics data items to a process for controlling number of codes to be finally output, to generate a plurality of codes; accumulating first information indicating a relationship between a plurality of parts to be subjected to entropy coding, which are contained in the generated codes, and a frequency of generation of each of the parts; pre-accumulating second information indicating a relationship between entropy information and a plurality of first code words generated based on the entropy information, the entropy information indicating amounts of entropy of typical data; generating a plurality of second code words corresponding to the generated codes, based on the accumulated first information and the pre-accumulated second information; subjecting the generated codes to entropy coding based on the generated second code words to generate a plurality of entropy codes; extracting minimum information for decoding from the accumulated first information and the pre-accumulated second information, based on the generated code words; coding the minimum information in order to reduce an amount of the minimum information; and outputting the entropy codes and the coded minimum information.

In accordance with a tenth aspect of the invention, there is provided a computer graphics data coding method comprising: acquiring a plurality of computer graphics data items; pre-processing the acquired computer graphics data items; accumulating first information indicating a relationship between a plurality of parts to be subjected to entropy coding, which are contained in the computer graphics data items performed in the pre-process, and a frequency of generation of each of the parts; pre-accumulating second information indicating a relationship between entropy information and a plurality of first code words generated based on the entropy information, the entropy information indicating amounts of entropy of typical data; generating a plurality of second code words corresponding to the pre-processed computer graphics data items, based on the accumulated first information and the pre-accumulated second information; subjecting the pre-processed computer graphics data items to entropy coding based on the generated second code words, to generate a plurality of entropy codes; subjecting the generated entropy codes to a process for controlling number of codes to be finally output, to generate a plurality of codes; extracting minimum information for decoding from the accumulated first information and the pre-accumulated second information, based on the generated second code words; coding the minimum information in order to reduce an amount of the minimum information; and outputting the codes generated by the process, and the coded minimum information.

In accordance with an eleventh aspect of the invention, there is provided a method of decoding a plurality of computer graphics data items coded by the computer graphics data coding method as described in seventh or eighth aspect, the method comprising: acquiring the coded data items; decoding the coded minimum information; generating decode information used to acquire a plurality of decode words for decoding the code words, based on the decoded minimum information; accumulating the decode information; decoding the entropy codes, using the decode information; decoding the decoded entropy data into data present before the number of codes is controlled;

decoding the data into computer graphics data items before the pre-processed computer graphics data items, using an inverse process to a pre-process for pre-processing the acquired computer graphics data items; and outputting the acquired computer graphics data items.

In accordance with a twelfth aspect of the invention, there is provided a method of decoding a plurality of computer graphics data items coded by the computer graphics data coding method as described in ninth or tenth aspect, the method comprising: acquiring the coded data items; decoding the coded minimum information; generating decode information indicating a relationship between the code words and a plurality of decode words corresponding to the code words, based on the decoded minimum information, and the second information; accumulating the decode information; decoding the entropy codes, using the decode information; decoding the decoded entropy data into data present before the number of codes is controlled; decoding the data into the computer graphics data items before the pre-processed computer graphics data items, using an inverse process to a pre-process for pre-processing the acquired computer graphics data items; and outputting the acquired computer graphics data items.

In accordance with a thirteenth aspect of the invention, there is provided a computer graphics data coding program stored in a medium which can be read by a computer, the program comprising: means for instructing the computer to acquire a plurality of computer graphics data items; means for instructing the computer to pre-process the acquired computer graphics data items; means for instructing the computer to subject the pre-processed computer graphics data items to a process for controlling number of codes to be finally output, to generate a plurality of codes; means for instructing the computer to accumulate a plurality of parts to be subjected to entropy coding, which are contained in the generated codes; means for instructing the computer to calculate entropy information based on the accumulated parts, and generate a plurality of code words based on the entropy information, the entropy information indicating an amount of entropy; means for instructing the computer to subject the generated codes to entropy coding based on the generated code words, to generate a plurality of entropy codes; means for instructing the computer to extract, from the entropy information, minimum information for decoding; means for instructing the computer to code the minimum information in order to reduce an amount of the minimum information; and means for instructing the computer to output the entropy codes and the coded minimum information.

In accordance with a fourteenth aspect of the invention, there is provided a computer graphics data coding program stored in a medium which can be read by a computer, the program comprising: means for instructing the computer to acquire a plurality of computer graphics data items; means for instructing the computer to pre-process the acquired computer graphics data items; means for instructing the computer to accumulate the pre-processed computer graphics data items; means for instructing the computer to calculate entropy information based on a plurality of code parts of the accumulated computer graphics data items, and generate a plurality of code words based on the entropy information, the entropy information indicating an amount of entropy; means for instructing the computer to subject the accumulated computer graphics data items to entropy coding based on the generated code words, to generate a plurality of entropy codes; means for instructing the computer to subject the generated entropy codes to a process for controlling number of codes to be finally output, to generate a plurality of codes; means for instructing the computer to extract, from the entropy information, minimum information for decoding; means for instructing the computer to code the minimum information in order to reduce an amount of the minimum information; and means for instructing the computer to output the codes acquired by the process, and the coded minimum information.

In accordance with a fifteenth aspect of the invention, there is provided a computer graphics data coding program stored in a medium which can be read by a computer, the program comprising: means for instructing the computer to acquire a plurality of computer graphics data items; means for instructing the computer to pre-process the acquired computer graphics data items; means for instructing the computer to subject the pre-processed computer graphics data items to a process for controlling number of codes to be finally output, to generate a plurality of codes; means for instructing the computer to accumulate first information indicating a relationship between a plurality of parts to be subjected to entropy coding, which are contained in the generated codes, and a frequency of generation of each of the parts; means for instructing the computer to pre-accumulate second information indicating a relationship between entropy information and a plurality of first code words generated based on the entropy information, the entropy information indicating amounts of entropy of typical data; means for instructing the computer to generate a plurality of second code words corresponding to the generated codes, based on the accumulated first information and the pre-accumulated second information; means for instructing the computer to subject the generated codes to entropy coding based on the generated second code words, to generate a plurality of entropy codes; means for instructing the computer to extract minimum information for decoding from the accumulated first information and the pre-accumulated second information, based on the generated second code words; means for instructing the computer to code the minimum information to reduce an amount of the minimum information; and means for instructing the computer to output the entropy codes, and the coded minimum information.

In accordance with a sixteenth aspect of the invention, there is provided a computer graphics data coding program stored in a medium which can be read by a computer, the program comprising: means for instructing the computer to acquire a plurality of computer graphics data items; means for instructing the computer to pre-process the acquired computer graphics data items; means for instructing the computer to accumulate first information indicating a relationship between a plurality of parts to be subjected to entropy coding, which are contained in the computer graphics data items performed in the pre-process, and a frequency of generation of each of the parts; means for instructing the computer to pre-accumulate second information indicating a relationship between entropy information and a plurality of first code words generated based on the entropy information, the entropy information indicating amounts of entropy of typical data; means for instructing the computer to generate a plurality of second code words corresponding to the pre-processed computer graphics data items, based on the accumulated first information and the pre-accumulated second information; means for instructing the computer to subject the pre-processed computer graphics data items to entropy coding based on the generated second code words, to generate a plurality of entropy codes; means for instructing the computer to subject the generated entropy codes to a process for controlling number of codes to be finally output, to generate a plurality of codes; means for instructing the computer to extract minimum information for decoding from the accumulated first information and the pre-accumulated second information, based on the generated second code words; means for instructing the computer to code the minimum information in order to reduce an amount of the minimum information; and means for instructing the computer to output the codes generated by the process, and the coded minimum information.

In accordance with a seventeenth aspect of the invention, there is provided a decoding program stored in a medium which can be read by a computer, and used for decoding a plurality of computer graphics data items coded using the computer graphics data coding program as described in thirteenth or fourteenth aspect, the program comprising: means for instructing the computer to acquire the coded data items; means for instructing the computer to decode the coded minimum information; means for instructing the computer to generate decode information used to acquire a plurality of decode words for decoding the code words, based on the decoded minimum information; means for instructing the computer to accumulate the decode information; means for instructing the computer to decode the entropy codes, using the decode information; means for instructing the computer to decode the decoded entropy data into data present before the number of codes is controlled; means for instructing the computer to decode the data into the computer graphics data items before the pre-processed computer graphics data items, using an inverse process to a pre-process for pre-processing the acquired computer graphics data items; and means for instructing the computer to output the acquired computer graphics data items.

In accordance with an eighteenth aspect of the invention, there is provided a decoding program stored in a medium which can be read by a computer, and used for decoding a plurality of computer graphics data items coded using the computer graphics data coding program as described in fifteenth or sixteenth aspect, the program comprising: means for instructing the computer to acquire the coded data items; means for instructing the computer to decode the coded minimum information; means for instructing the computer to generate decode information indicating a relationship between the code words and a plurality of decode words corresponding to the code words, based on the decoded minimum information, and the second information; means for instructing the computer to accumulate the decode information; means for instructing the computer to decode the entropy codes, using the decode information; means for instructing the computer to decode the decoded entropy data into data present before the number of codes is controlled; means for instructing the computer to decode the data into the computer graphics data items before the pre-processed computer graphics data items, using an inverse process to a pre-process for pre-processing the acquired computer graphics data items; and means for instructing the computer to output the second data.

BRIEF DESCRIPTION OF THE SEVERAL VIEWS OF THE DRAWING

FIG. 11 is a block diagram illustrating a computer graphics data coding apparatus according to modification 2 of the first embodiment;

FIG. 12 is a table used, to compress three elements, by a pre-process coding unit employed in modification 3 of the first embodiment;

FIG. 13 is a table used to compress two or four elements as in the case of FIG. 12;

FIG. 16 is a table illustrating codes accumulated in the code-word information accumulation unit appearing in FIG. 14;

FIG. 17 is an example of a code table corresponding to computer graphics data indicating a state in which the tops of, for example, spherical bodies are uniformly arranged;

DETAILED DESCRIPTION OF THE INVENTION

Computer graphics data coding apparatuses, decoding apparatuses, coding methods and decoding methods according to embodiments of the invention will be described in detail with reference to the accompanying drawings.

The embodiment of the present invention has been developed to overcome the problems, and aims to provide a computer graphics data coding apparatus, decoding apparatus, coding method and decoding method for enhancing throughput when encoding and decoding computer graphics data, and for reducing the cost of the hardware for processing the data.

The computer graphics data coding apparatus, decoding apparatus, coding method and decoding method of the embodiments can enhance the throughput when encoding and decoding computer graphics data, and can reduce the cost of the hardware for processing the data.

First Embodiment

Figure 1:
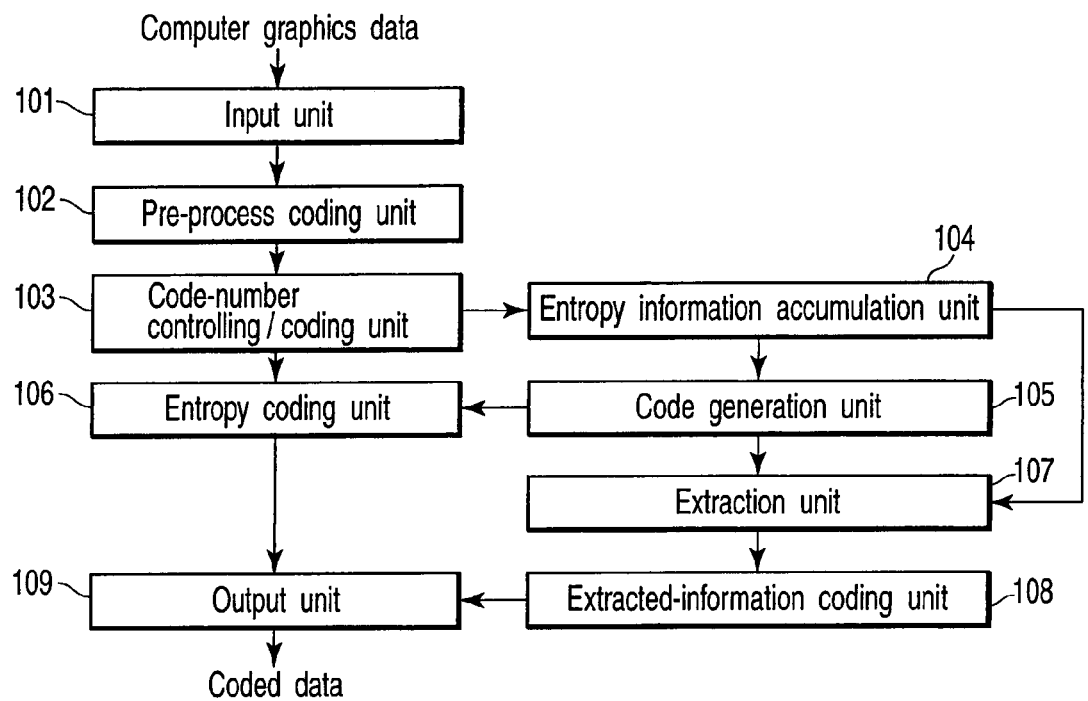
FIG. 1 is a block diagram illustrating a computer graphics data coding apparatus according to a first embodiment of the invention.

FIG. 1 is a block diagram illustrating the entire configuration of a computer graphics data coding apparatus according to a first embodiment of the invention.

As shown, the computer graphics data coding apparatus of the first embodiment comprises an input unit 101, pre-process coding unit 102, code-number controlling/coding unit 103, entropy information accumulation unit 104, code generation unit 105, entropy coding unit 106, extraction unit 107, extracted-information coding unit 108 and output unit 109.

The input unit 101 acquires computer graphics data.

The pre-process coding unit 102 performs pre-processing, such as quantization, normalization, etc., of the data acquired by the input unit 101.

The code-number controlling/coding unit 103 subjects the codes generated by the pre-process coding unit 102 to a process for controlling the number of codes to be generated by the entropy coding unit 106, before the entropy coding unit 106 codes them.

The entropy information accumulation unit 104 accumulates entropy information concerning the codes generated by the code-number controlling/coding unit 103.

The code generation unit 105 generates code words using the entropy information accumulated by the entropy information accumulation unit 104.

The entropy coding unit 106 subjects the codes generated by the code-number controlling/coding unit 103 to entropy coding, using the code words generated by the code generation unit 105.

The extraction unit 107 extracts minimal decoding information necessary for decoding from the entropy information used by the code generation unit 105 to generate the code words.

The extracted-information coding unit 108 codes the decoding information generated by the extraction unit 107.

The output unit 109 outputs the codes generated by the entropy coding unit 106, and the codes generated by the extracted-information coding unit 108.

Each of the above-mentioned units will now be described in detail.

<<Input Unit 101>>

The input unit 101 is used to acquire computer graphics data. In the field of computer graphics, in general, each configuration is represented by a combination of triangles called polygons. In this case, data concerning each configuration is represented as a set of coordinates indicating the vertexes of the triangles. The coordinates can be represented by a 3-dimensional vector indicating the positions (x, y, z) in the 3-dimensional space, or by a 4-dimensional vector indicating (x, y, z, w) and acquired using a homogenous coordinate system.

Further, in the field of computer graphics, vertex data is represented using various types of data, such as normal information, color information or surface-property information. All these information items can be represented as vector data. Therefore, in the embodiment, it is assumed that computer graphics data indicates vector data of arbitrary dimensions that includes, as elements, numerical values for representing position, normal, color information, etc.

The input unit 101 acquires a set of such vector data items. In the description below, positional data will be described as an example. However, the same can be said of any other type of data.

As described above, the positional data can be represented by 3-dimensional vector data (x, y, z) or 4-dimensional vector data (x, y, z, w). In the description below, the positional data is represented by 3-dimensional vector data (x, y, z).

The elements x, y and z included in the positional data (x, y, z) indicate the x-coordinate, y-coordinate and z-coordinate in the 3-dimensional space, respectively. The elements of the positional data are often represented as decimal data. The positional data is managed as vector data and sequentially input to the input unit 101 as data indicating the vertexes of polygons.

<<Pre-Process Coding Unit 102>>

The pre-process coding unit 102 performs quantization, normalization, etc., on vertex data acquired by the input unit 101 and indicating normal information, color information, surface-property information, etc. (in the embodiment, the vertex data indicates position data as mentioned above).

As described above, the vertex data is vector data including decimal data items as elements. It is necessary to quantize each element value in order to make it be represented in the computer. There are some quantization methods. These methods can be roughly classified into methods for representing decimals in a floating-point mode, and methods for representing them in a fixed-point mode. These quantization methods are not the essential part of the embodiment, and therefore not described in detail. Briefly, in the methods for representing data in a fixed-point mode, quantized data is represented with the decimal point fixed. In the other methods, quantized data is represented with the decimal point not fixed. Note that a floating-point mode in which the bit length used for quantization (quantization bit length) is set to 32 bits is stipulated in IEEE754.

The floating-point mode is characterized in that data of a very wide range (from $2^{-126}$ to $2^{127}$) can be represented as 32-bit data. However, in this mode, decimal data is managed as sign part information, exponential part information and mantissa part information. Therefore, handling of numerical values may well be complex.

This being so, many inexpensive hardware systems employ the fixed-point mode. In the fixed-point mode, however, the range of data that can be represented is not wide, since the bit position of the decimal point of quantized data is fixed. Furthermore, since the decimal point is fixed, the accuracy of decimals that can be represented is limited.

To overcome the above problem, it is necessary to normalize data. The problem of accuracy in the fixed-point mode can be overcome by normalizing data in one way or another, and making the range of existence of normalized data fall within the range of numerical-value representation in the fixed-point mode.

<Normalization>

Data normalization performed by the pre-process coding unit 102 will be described.

Data normalization means conversing all data items to be coded to make them fall within a particular range. Specifically, in data normalization, for example, each value is divided by the maximum value existing in the data. A description will be given of an example where data is normalized into −1 to 1.

Assume here that the following position data sequence ($x_m$, $y_m$, $z_m$) exists, m being 0, 1, . . . , n:

$x_1, y_1, z_1$ $x_2, y_2, z_2$

. . .

$x_n, y_n, z_n$

In this case, firstly, the maximum value Vmax of the data sequence is acquired. Vmax is given by the following equation (1):

$$V\max=\max (|x_1|, |y_1|, |z_1|, \ldots, |x_n|, |y_n|, |z_n|) \quad (1)$$

where max ( ) represents a function for returning the maximum value of the elements in the parentheses.

Subsequently, the normalized value (scale) is acquired using the following equation (2):

$$\text{scale} = V\text{max} \quad (2)$$

Normalization of vertex data is performed using the following equation (3):

$$V' = V/\text{scale} \quad (3)$$

where V indicates original data, and V' indicates normalized data.

Thus, data is normalized into −1 to 1.

When normalization is performed, if data is divided into arbitrary areas, and the above process is performed on each of the areas, the accuracy of normalization can be enhanced. The range of division is selected so that data of as close orders as possible will be contained in each area.

Figure 2:
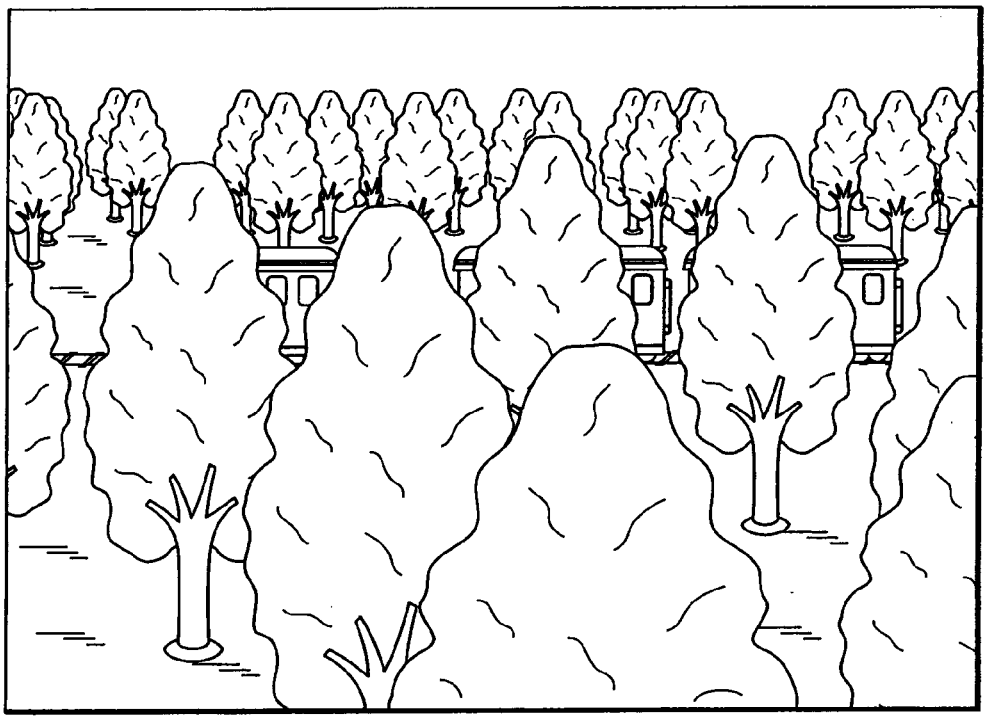
FIG. 2 is a view useful in explaining computer graphics data.

In many cases, computer graphics data is prepared corresponding to several divisions of an image. This will be explained with reference to, for example, FIG. 2. FIG. 2 shows a scene where a train runs through a forest. In this case, data is prepared corresponding to units, such as "train", "ground", "rail" and "trees".

It is desirable that normalization be executed in each unit.

Figure 3:
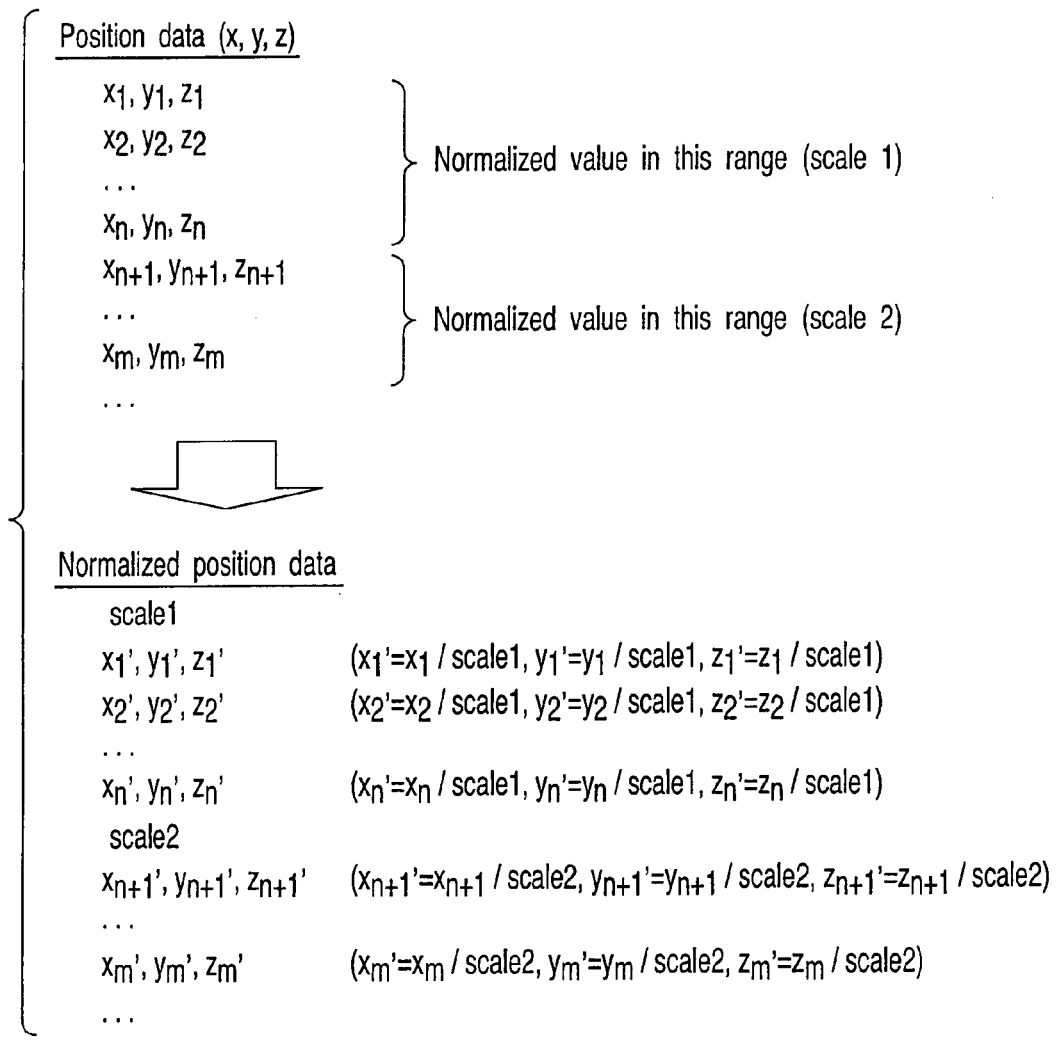
FIG. 3 is a view useful in explaining normalization performed by the pre-process coding unit appearing in FIG. 1.

The pre-process coding unit 102 manages data in the order of "normalized value (=scale value)", "data", "data", . . . , "normalized value", "data", "data", . . . . The application range of "normalized value" is a sequence of data existing between a certain normalized value and the next normalized value. Referring to FIG. 3, an example of a normalized position-data sequence acquired by normalizing position data will be described. Position data $(x_j, y_j, z_j)$ (j=1, 2, . . . , n, . . . , m, . . . ) with a normalized value of scale i (i=1, 2, . . . ) are normalized into $(x_j/\text{scale i}, y_j/\text{scale i}, z_j/\text{scale i})$, respectively.

Note that it is not necessary to normalize data that falls within a particular range. For instance, in the case of normal data, data is often generated as normalized normal data (data in which the normal vector has a length of 1). In this case, it is guaranteed that the original data falls within the range of −1 to 1, therefore it is not necessary for the pre-process coding unit 102 to normalize data.

<Quantization>

A description will now be given of quatization performed by the pre-process coding unit 102.

Figure 4:
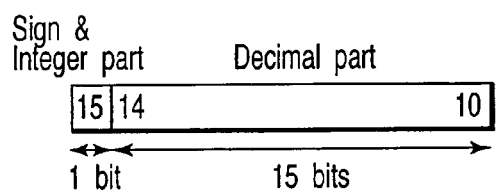
FIG. 4 is a view illustrating a data format employed for quantization by the pre-process coding unit appearing in FIG. 1.

Referring first to FIG. 4, a data format example used for quatization will be described. Note that the following is a description concerning a scheme example, and the invention is not limited to it.

FIG. 4 shows a case where quantization is performed using a format with a quantization bit length of 16 bits. This format is formed of one bit indicating a sign and integer part, and 15 bits indicating a decimal part. Using the format, the previously quantized data is normalized. For example, 0.25 is quantized into 0010000000000000, and −0.111 is quantized into 1111000111001011.

The above-described normalized value falls within a range of [−1, 1]. In general, to represent a value falling within this range, 2 bits are necessary for the sign and integer part. However, if 2 bits are used, an unused area (i.e., an area of [−2, −1), (1, 2]) will inevitably be generated, which increases the useless memory amount. Further, the decimal part is reduced to 14 bits, thereby degrading the decimal representation accuracy. In this embodiment, one bit is imparted to the sign and integer part, and 15 bits are imparted to the decimal part.

In this case, the representation-enabled area can store quantized values ranging from −1 to $1\frac{1}{2}^{15}$ (=0.999969482421875). Since the quantized values falling within a range of $[1\frac{1}{2}^{15}, 1]$ cannot be represented, they are all set to $1\frac{1}{2}^{15}$. Namely, if (value>$1\frac{1}{2}^{15}$) then value=$1\frac{1}{2}^{15}$ (if the value is higher than $1\frac{1}{2}^{15}$, then it is set to $1\frac{1}{2}^{15}$.). This setting will cause an error of $\frac{1}{2}^{15}$ (=about 0.00003) at maximum.

In general, if the decimal part is set to N bits, the quantization bit length is (N+1) bits. If a user is permitted to designate the quantization bit length, they can control the accuracy of quantization.

Thus, if the user changes the quantization bit length, the code-number controlling/coding unit 103 and other units located behind the unit 103 must process data of a plurality of bit lengths. To avoid this complex operation, the normalized value given by the following equation (4) is used instead of that given by the equation (2), thereby enabling data to be represented using a particular bit length regardless of whether the user designates any quantization bit length:

$$\text{scale} = V\text{max} \times 2^{Q-N} \quad (4)$$

where Q is the maximum quantization bit length to be used, and N is an integer not less than 2 and not more than Q and represents a quantization bit length designated by the user. If N is set to a high value, degradation of the accuracy of vertex data can be suppressed, although the coding efficiency is reduced. In contrast, if N is set to a low value, a high coding efficiency can be attained, although the vertex data accuracy is degraded. These two factors are in a trade-off relationship.

By the above operation, data can be normalized to $-\frac{1}{2}^{16-N}$ to $\frac{1}{2}^{16-N}$. Accordingly, the accuracy of data substantially corresponds to the accuracy of N-bit data. The internal use of the quantization format of FIG. 4 with the value of Q set to 16 enables the maximum quantization bit length to be set to 16 bits as internal representation, and simultaneously enables the user to designate the accuracy of data by designating the number of bits. The factor for realizing this is contained in the normalized value (scale) as shown in the equation (4).

In light of the accuracy acquired after decoding, the normalized value (scale) is quantized using, for example, a 32-bit floating-point mode. Further, the process based on the equation (4) is a dispensable one. However, assuming that this process is employed, the following will be described.

Furthermore, although in the above, the quantization scheme has been explained as a fixed-point mode using a particular format, the invention is not limited to this. Coding may be performed using a floating-point mode or other modes that are not described in this description.

In addition, the pre-process coding unit 102 may calculate first-order differential data. First-order differential is performed for enhancing the effect of entropy coding described later. This will now be described.

<First-Order Differential>

Figure 5:
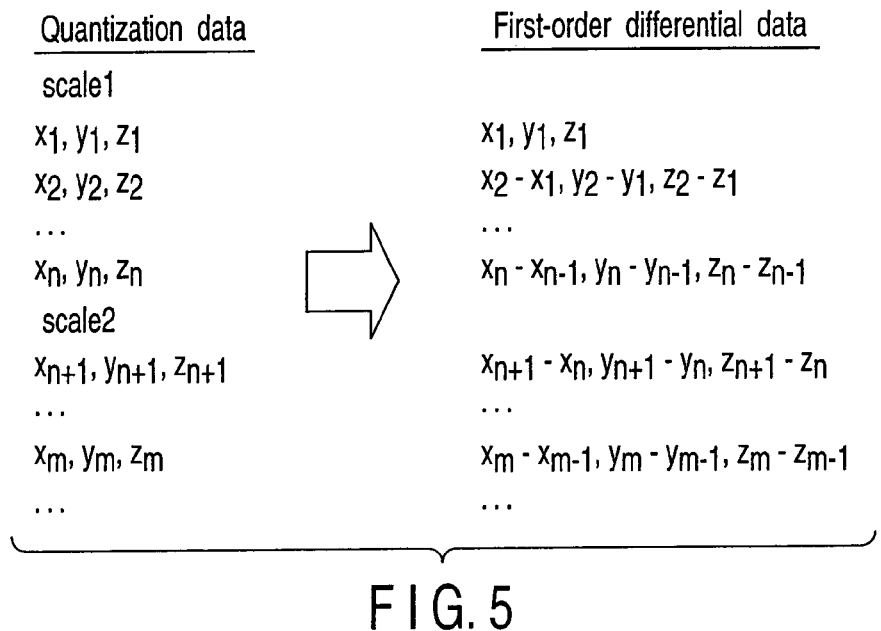
FIG. 5 is a view useful in explaining first-order differential performed by the pre-process coding unit appearing in FIG. 1.

Quantization data acquired in the above-described manner is subjected to first-order differential. First-order differential vector data $\Delta V_n$ is given by $$\Delta V_n = V_n - V_{n-1} \ (n=0, 1, 2, \ldots) \quad (5)$$

where $V_n$ is the $n^{th}$ position vector data, and $V_{-1}$ is zero vector data. If the quantization data is, for example, position data, such first-order derivative data as shown in FIG. 5 is acquired. In this embodiment, since the quantization data can assume a value falling within a range of −1 to 1, its differential value can assume a value falling within a range of −2 to 2. Accordingly, in the 16-bit fixed-point mode shown in FIG. 4, overflow and underflow will occur.

Figure 6:
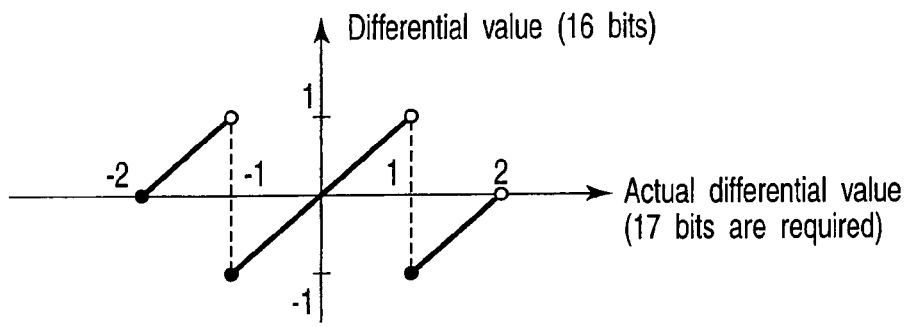
FIG. 6 is a view illustrating an example of a function for converting a differentiated value, employed in the pre-process coding unit appearing in FIG. 1.

To avoid this, actual differential values are converted using such a function as shown in FIG. 6, with the result that differential values can be uniquely determined even in the 16-bit fixed-point mode. Namely, since actual first-order differential values are 2 at maximum, all differential values can be uniquely determined using the function shown in FIG. 6, when they assume a value not higher than 2.

For instance, if $V_n$ is 16'b1010011001100110 (=−0.7), and $V_{n-1}$ is 16'b0100110011001101 (=0.6), $\Delta V_n$ is determined to be 16'b0101100110011010, based on the equation (5) and the function shown in FIG. 6. Here, the symbol of "16bXXXXXXXXXXXXXXXX" represents "XXXXXXXXXXXXXXXX" is described in binary number of 16 bits.

This is the end of the coding process by the pre-process coding unit 102. The coding process by the pre-process coding unit 102 is a pre-process for the later-stage units. By virtue of this pre-process, the later-stage units can uniformly process the quantized 16-bit sequence.

In the above-described embodiment, just examples of data normalization, quantization and first-order differential are described. It is a matter of course that the invention is not limited to those examples.

<<Code-Number Controlling/Coding Unit 103>>

The code-number controlling/coding unit 103 is used to code the codes generated by the pre-process coding unit 102 so that the number of codes generated by the entropy coding unit 106 is controlled.

If, for example, the entropy coding unit 106 performs entropy coding on all codes generated by the pre-process coding unit 102, the number of output codes is as large as $2^{16}$ when the quantization bit length is 16 bits. Further, the possible maximum code length is $(2^{16}+1)$ bits.

In other words, if the entropy coding unit 106 performs entropy coding on all codes generated by the pre-process coding unit 102, it is necessary to design the decoder for decoding data acquired after entropy coding so that the decoder is adaptable for all conditions including the above-mentioned conditions. This is very disadvantageous in the cost of computation and accordingly the price of the product, as described in the section "Description of the Related Art".

The code-number controlling/coding unit 103 is prepared to overcome this problem. It further codes the codes generated by the pre-process coding unit 102 to limit the number and lengths of codes that may be generated and processed by the entropy coding unit 106.

<SzBIN Coding and Format>

The code-number controlling/coding unit 103 is characterized in that it codes the codes generated by the pre-process coding unit 102 into "a combination of representation of the code in a minimum-length form and information indicating the bit-length of the code" (hereinafter referred to as a "SzBIN code").

Figure 7:
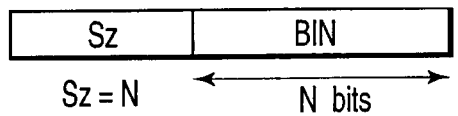
FIG. 7 is a view illustrating the format of an SzBIN code acquired by coding by the code-number controlling/coding unit appearing in FIG. 1.

The SzBIN code is a scheme in which data is converted into a BIN code (data of an expressible minimum bit length), described later, and the resultant code is combined with its bit-length information (Sz) into one code. In this SzBIN code, a code acquired by BIN coding, described later, is stored in the BIN part, and the bit-length information concerning the BIN code is stored in the Sz part. FIG. 7 shows the format of the SzBIN code.

In the embodiment, data before coding is represented in the 16-bit fixed-point mode as shown in FIG. 4. In this case, a BIN code acquired by subjecting the data to BIN coding can assume a bit length falling within a range of 0 to 16 bits. Therefore, Sz can assume a value falling within a range of 0 to 16. In light of this, the Sz part is represented by a fixed length of 5 bits. The BIN part is variable-length data acquired by BIN coding. Therefore, when 5 bits are assigned to the Sz part, the area corresponding to values of 17 to 31 is an unused area. This unused area may be used to store various parameters when necessary. For example, it is preset that when Sz assumes a value not lower than 17, the subsequent BIN data area stores a parameter. In this case, Sz serves as an identifier that does not indicate bit-length information related to the BIN part, but indicates the type of the parameter. The bit length indicated by the BIN part subsequent to the Sz part denotes the data length of the preset parameter (a specific example will be described later referring to FIG. 9).

<BIN Coding Method>

Each BIN code generated by the code-number controlling/coding unit 103 is acquired by performing the following two conversion steps on the data represented in the 16-bit fixed-point mode:

1. The 16-bit data is assumed to be integer data represented in a two's complement numbers mode, and converted into data represented in a minimum representation mode in the two's complement numbers mode; and 2. The most significant bit (MSB) of the data in the minimum representation acquired in the above step 1 is subtracted from the remaining bit data.

Firstly, a description will be given of step 1 conversion of the 16-bit fixed-point representation into the two's complement numbers representation.

If the 16-bit data is a positive number, the minimum representation included in the two's complement numbers representation is acquired by eliminating all successive "0" bits that begin with the "0" bit next to MSB. For instance, if all successive "0" bits that begin with the "0" bit next to MSB are eliminated from 16'b0000010110011110, the resultant data is 12'b010110011110.

In contrast, if the 16-bit data is a negative number, the minimum representation included in the two's complement numbers representation is acquired by eliminating all successive "1" bits that begin with the "1" bit next to MSB. For instance, if all successive "1" bits that begin with the "1" bit next to MSB are eliminated from 16'b1110010110011110, the resultant data is 14'b10010110011110.

Step 2 will be described. At step 2, MSB in the minimum representation acquired in the above step 1 is subtracted from the remaining bit data.

(Positive 16-Bit Data)

Specifically, if the minimum representation acquired at step 1 is 12'b010110011110, MSB of the minimum representation is 1'b0, and the remaining bit data is 11'b10110011110. Therefore, if MSB is subtracted from the remaining bit data, the resultant data is 11'b10110011110−1'b0=11'b10110011110, with the result that a BIN code of 16'b0000010110011110 is acquired.

(Negative 16-Bit Data)

If the minimum representation acquired at step 1 is 14'b10010110011110, MSB of the minimum representation is 1'b1, and the remaining bit data is 13'b0010110011110. Therefore, if MSB is subtracted from the remaining bit data, the resultant data is 13'b0010110011110−1'b1=13b0010110011101, with the result that a BIN code of 16'b1110010110011110 is acquired.

<Exceptions to BIN Coding>

There are exceptions to BIN coding. For instance, 16'b1000000000000000 is an exception, and the above-described calculation cannot be performed. This data is maintained unchanged even if it is subjected to BIN coding. This is only one BIN code in which Sz is 16.

<Acquisition of Sz>

Sz indicates the bit length of the BIN code acquired as above, and is represented by a fixed length of 5 bits.

Sz can be acquired without the above-described BIN coding. Namely, it can be acquired in the following manner:

1. If data is a positive number, it is maintained as it is. In contrast, if data is a negative number, it is converted into a positive number using a two's complement numbers related to the negative number.

2. If the position of the highest-order "1" bit is N, Sz=N+1. If there is no "bit", Sz=0. For instance, in the case of 16'b1000000000000000, since the $15^{th}$ bit (MSB) is the highest-order "1" bit, N=15 and Sz=16. Further, in the case of 16'b0100010111100000, since the $14^{th}$ bit is the highest-order "1" bit, N=14 and Sz=15. In other words, assuming that data is a 16-bit integer, if the maximum value of N that satisfies the condition, the data$\geq_2$N, is used, Sz=N+1 is acquired.

If Sz is calculated in the manner as the above, BIN codes can be acquired even by the following simple method:

1. If Sz=16 or data is a positive number, data of the low-order bits corresponding to Sz is regarded as BIN code data.

2. If data is a negative number, data of the low-order bits, from which 1'b1 is subtracted and which correspond to Sz, is regarded as BIN code data.

Figures 8, 9, 10:
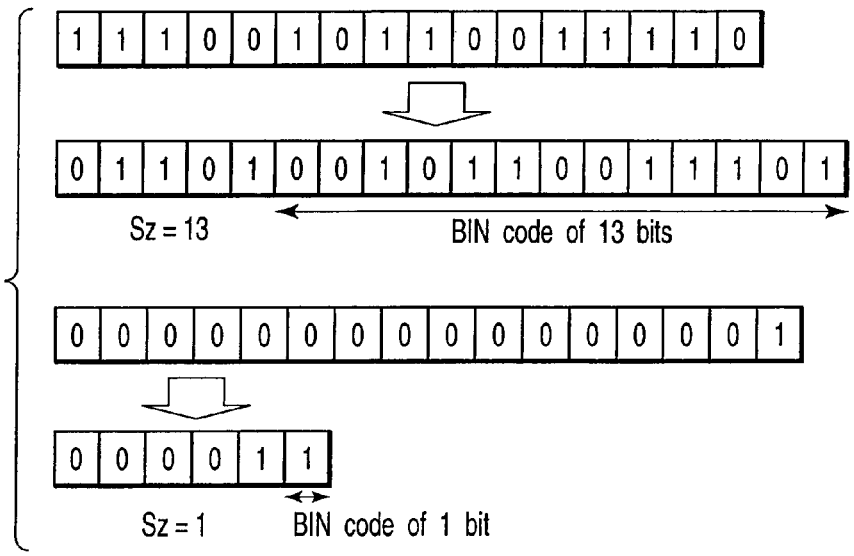
FIG. 8 is a view useful in explaining a method for acquiring a BIN code from an Sz value, employed in the code-number controlling/coding unit appearing in FIG. 1.
FIG. 9 is a view illustrating an example of a format in which a normalized value is contained in code data, the format being acquired by generating an SzBIN format using a non-use area in Sz.
FIG. 10 is an example of a frequency table generated by the entropy information accumulation unit appearing in FIG. 1.

Referring to FIG. 8, a description will be given of how to calculate Sz to acquire a BIN code, using specific cases of SzBIN coding.

The upper 16-bit data (16'b1110010110011110) of FIG. 8 is a negative number, therefore a two's complement numbers related to the negative number is acquired. Namely, in this example, the two's complement numbers is:

16'b0001101001100001+1'b1=16'b0001101001100010

In this case, since the position of the highest-order "1" bit is 12, Sz=13. Further, since the 16-bit data is a negative number, data corresponding to the thirteen (=Sz) low-order bits of 16'b1110010110011101 (=16'b1110010110011110−1'b1) is regarded as BIN code data. That is, the BIN code data is 13'b0010110011101.

In contrast, the lower 16-bit data (16'b0000000000000001) of FIG. 8 is a positive number, therefore it is not necessary to acquire a two's complement numbers related to the number. Since the position of the highest-order "1" bit is 0, Sz=1. Further, since the 16-bit data is the positive number, data corresponding to the one (=Sz) low-order bit of 16'b0000000000000001 is regarded as BIN code data. That is, the BIN code data is 1'b1.

<Special Use of Sz (Mixture of Non-Vertex Data in SzBIN Data)>

Various parameters can be contained in a SzBIN code using the unused area of Sz. For instance, a normalized value (scale value) calculated during normalization, which must generally be sent to a decoder via a path different from the path for code data, can be contained in the code data if it is converted into the SzBIN format using the unused area of Sz, and therefore can be sent via a single path together with the code.

Specifically, as shown in FIG. 9, Sz=31 is used as an identifier for identifying a normalized value (scale value), and the normalized value (scale value) is represented in 32-bit floating-point mode and stored as BIN data subsequent to the identifier. When Sz indicates a value in the unused area, it is used as an identifier, and not used to indicate the bit length of the BIN data subsequent to the identifier.

When data is expanded, if Sz falls within a range of 0 to 16, BIN data corresponding to Sz is acquired to decode the data, whereas if Sz exceeds the range, a process for acquiring data corresponding to the length of the parameter indicated by the identifier is performed. Thus, Sz enables a parameter and vertex data to be expanded individually.

<Advantages of SzBIN Coding>

The above-described SzBIN coding provides the following advantages:

1. If the entropy coding unit 106 performs, for example, Huffman coding, a type of entropy coding, only on the Sz part, the number of possible Huffman code words is only 17 at maximum, and the maximum code length can be suppressed to 18 bits, since Sz is a code represented by 5 bits.

2. As mentioned above, code data can contain data (e.g., the normalized value (scale)) that is not a target of coding.

<<Entropy Information Accumulation Unit 104>>

The entropy information accumulation unit 104 extracts, from the codes generated by the code-number controlling/coding unit 103, a portion of the code to be subjected to entropy coding by the entropy coding unit 106, and accumulates it. For example, the entropy information accumulation unit 104 sequentially accumulates the respective Sz parts of SzBIN codes generated by the code-number controlling/coding unit 103.

Further, the entropy information accumulation unit 104 simultaneously adjusts the amount of entropy necessary for entropy coding by the entropy coding unit 106. Alternatively, the code generation unit 105 may adjust the amount of entropy.

A description will hereinafter be given of Huffman coding, as an example of entropy coding, performed by the entropy coding unit 106. When Huffman coding is performed, the amount of entropy used for it is information indicating the relationship between the codes generated by the code-number controlling/coding unit 103 and the frequency of generation of each code.

While accumulating Sz codes, the entropy information accumulation unit 104 counts the frequency of generation of each Sz value. After finishing counting concerning all data, the entropy information accumulation unit 104 generates a frequency table. As shown in FIG. 10, the frequency table illustrates the frequency of generation of each Sz value. The entropy information accumulation unit 104 calculates the probability of generation of each Sz value (0 to 16) contained in data. Generation probability $p_{Sz}$ is given by $p_{Sz}$=the number of generations of $Sz$/the number of all data items      (6)

In the table example of FIG. 10, the generation probabilities of Sz values of 0, 1, 2, . . . are A, B, C, . . . , respectively.

Concerning such parameters as mentioned above that are to be contained in an SzBIN code, the generation probability of each parameter may be calculated based on the number of the parameters (which include, for example, a normalized value) contained in data. Alternatively, the generation probability of each parameter may be set to a value lower than the generation probability of Sz of 0 to 16.

<<Code Generation Unit 105>>

The code generation unit 105 is used to generate code words used for entropy coding by the entropy coding unit 106. The code generation unit 105 utilizes information concerning the amount of entropy accumulated in the entropy information accumulation unit 104.

The operation of the code generation unit 105 will be described, assuming that Huffman coding is performed. The unit 105 generates Huffman code words in the following manner.

1. Reports of an information source are arranged in the descending order of generation probability $p_i$ (i=1, 2, . . . , N):

$p_1 \geq p_2 \geq \ldots \geq p_N$ 2. 0 and 1 are assigned to a pair of reports of the lowest generation probability and second lowest generation probability (generation of a Huffman node).

3. The sum of the probabilities of the pair of reports determined at step 2 is set to $q_k$ ($2 \leq k \leq N-2$), and the reports are re-arranged in the descending order of generation probability:

$p_{N-1} + p_N = q_k$ $p_1 \geq p_2 \geq \ldots \geq q_k \geq \ldots \geq p_{N-2}$ 4. The procedure from step 1 to step 3 is repeated (generation of a Huffman tree).

5. The order of report pairs, to which 0 and 1 are assigned, is reversely followed to acquire 0 and 1 sequentially arranged and to regard them as a code word (search of the Huffman tree).

For particulars, see documents concerning Huffman coding (e.g., Foundation of Information Compression Techniques by Kiyoshi Arai, TORIKEPS Corporation, 2003, ISBN4-88657-228-6, PP. 48-60).

As described above, the code generation unit 105 generates Huffman code words corresponding to the codes generated by the code-number controlling/coding unit 103.

<<Entropy Coding Unit 106>>

The entropy coding unit 106 performs entropy coding on the codes generated by the code-number controlling/coding unit 103, using the code words generated by the code generation unit 105.

Specifically, the entropy coding unit 106 refers to the code generation unit 105, thereby acquiring a code word corresponding to the Sz of a certain SzBIN code generated by the code-number controlling/coding unit 103. If this code word is represented by Huff(Sz), the entropy coding unit 106 performs Huff(Sz)BIN coding in which the code word Huff(Sz) is coupled to the BIN part of the certain SzBIN code generated by the code-number controlling/coding unit 103.

Assume here that a SzBIN code generated by the code-number controlling/coding unit 103 is 00011101. The Sz part of this code is 00011, which means that Sz=3, i.e., the subsequent 3-bit data, 101, is the BIN part. Assuming that the code generation unit 105 acquires code "11" as Huff(Sz) that indicates a code word corresponding to the Sz part "00011", the entropy coding unit 106 generates code "11101".

<<Extraction Unit 107>>

The extraction unit 107 extracts minimum information necessary for decoding from the entropy information used by the code generation unit 105 to generate the code word.

To decode a Huffman code, the Huffman code and a decode word corresponding thereto are necessary. It may be sufficient if every Huffman code contains a corresponding decode word. In this case, however, a large amount of data is required. Since the decode words can be reconstructed from the above-described Huffman tree, many decodes are designed to refer to the Huffman tree to reconstruct the decode words.

The extraction unit 107 extracts the Huffman tree from, for example, the entropy information accumulation unit 104 or the code generation unit 105. Note that the above-described Huffman tree is just an example of the minimum information necessary for decoding and to be extracted from the entropy information. The minimum information is not limited to the tree.

<<Extracted-Information Coding Unit 108>>

The extracted-information coding unit 108 is used to further code the information, extracted by the extraction unit 107, to reduce the amount of data. The unit 108 may employ any type of coding. It is sufficient if the amount of data after coding is less than the original amount.

<<Output Unit 109>>

The output unit 109 is used to output, with respect to all data input to the input unit 101, 1) the computer graphics data codes generated by the entropy coding unit 106, and 2) the codes for decoding generated by the extracted-information coding unit 108.

The above codes 1) and 2) may be output as different files, or may be combined together in one way or another and output as a single file. Further, the output form is not limited to the file form, but may be output to a memory or transfer path.

Advantage of the First Embodiment

The above-described computer graphics data coding apparatus of the first embodiment is contrived for limiting the number of code words and the maximum code length. Therefore, it can suppress the computation cost occurring when the decoder, described later in detail, performs decoding (namely, the computation speed can be enhanced), and can generate computer graphics data codes coded in a cost-effective form.

Modification 1 of the First Embodiment

In the first embodiment, the code-number controlling/coding unit 103 limits the number and lengths of codes that may be generated when the entropy coding unit 106 performs coding, using a combination of representation of the code in a minimum-length form and information indicating the bit-length of the code (SzBIN code). However, the code-number controlling/coding unit 103 can employ another coding method. A coding method according to modification 1 will hereinafter be described.

The computer graphics data coding apparatus according to modification 1 of the first embodiment is similar in the entire configuration to the apparatus of FIG. 1, and differs therefrom in the operations of some components. The different operations will be described.

<<Code-Number Controlling/Coding Unit 103>>

<Outline>

As in the first embodiment, the code-number controlling/coding unit 103 subjects the codes generated by the pre-process coding unit 102 to the process for controlling the number of codes to be generated by the entropy coding unit 106. However, modification 1 employs another method for the control.

<Coding Format>

The code-number controlling/coding unit 103 of modification 1 is characterized in that it divides, into "two or more codes", each code generated by the pre-process coding unit 102. Such division can be realized by some methods. A description will be given of one of the methods, i.e., a method for dividing a code into an upper-bit code and a lower-bit code.

Assume here that the codes generated by the pre-process coding unit 102 is a code acquired by 16-bit quantization. In this case, the code-number controlling/coding unit 103 divides this code into an upper 8-bit portion and lower 8-bit portion.

Each portion is an 8-bit code. If these codes are subjected to Huffman coding, the number of code words is reduced to $2^8=256$. The maximum code length is also reduced to 257 bits. Accordingly, using this method, the code-number controlling/coding unit 103 can perform control for reducing the number of codes, and shortening the maximum code length.

Although in this example, each code is divided into two portions, the same advantage can be acquired if each code is divided into 3 or more portions. Further, the number of divisions may be varied between codes.

<<Entropy Information Accumulation Unit 104 and Code Generation Unit 105>>

When the code-number controlling/coding unit 103 employs the above-described method differing from that employed in the first embodiment, the information processed by the entropy information accumulation unit 104 and code generation unit 105 is changed accordingly. In the first embodiment, the Sz part of the SzBIN code is used to perform data accumulation, frequency information generation and code generation. However, in modification 1, data generation, frequency information generation, etc., is performed using all new codes acquired by division, instead of the "Sz part".

<<Entropy Coding Unit 106>>

The entropy coding unit 106 codes each of the two or more codes generated by the code-number controlling/coding unit 103, using the codes generated by the code generation unit 105, thereby performing data coupling that is the opposite process to the data division by the code-number controlling/coding unit 103.

More specifically, when the code-number controlling/coding unit 103 has divided a code into an upper 8-bit code and lower 8-bit code, the entropy coding unit 106 firstly generates a Huffman code word A corresponding to the upper 8-bit code, and then a Huffman code word B corresponding to the lower 8-bit code. After that, the unit 106 couples the code words into a code so that the code word A corresponds to the upper-bit data of the code, and the code word B corresponds to the lower-bit data of the code.

Modification 2 of the First Embodiment

Figures 22, 23:
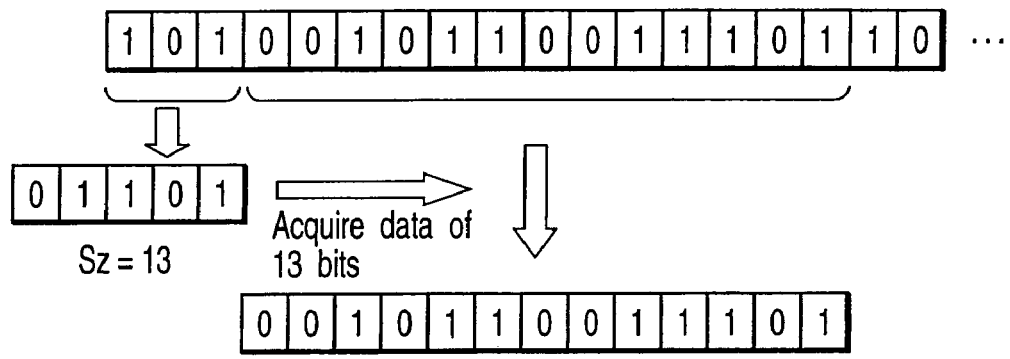
FIG. 22 is a view useful in explaining a series example of processes performed by the entropy decoding unit appearing in FIG. 21.
FIG. 23 is a table referred to by the post-processing decoding unit appearing in FIG. 21 to convert (n1, n2, n3) into (nx, ny, nz)

FIG. 11 shows the entire configuration of a computer graphics data coding apparatus according to modification 2 of the first embodiment. In FIG. 1 showing the first embodiment, and FIG. 22 showing modification 2, like reference numerals denote like elements, and no detailed description will be given thereof.

As shown, the computer graphics data coding apparatus according to modification 2 comprises an input unit 101, pre-process coding unit 102, code accumulation unit 1101, code generation unit 1102, entropy coding unit 1103, code-number controlling/coding unit 1104, extraction unit 107, extracted-information coding unit 108 and output unit 1105.

The code accumulation unit 1101 accumulates entropy information corresponding to the codes generated by the pre-process coding unit 102.

The code generation unit 1102 generates code words using the entropy information accumulated in the code accumulation unit 1101.

The entropy coding unit 1103 subjects the codes, generated by the pre-process coding unit 102, to entropy coding based on the code words generated by the code generation unit 1102.

The code-number controlling/coding unit 1104 performs control for limiting the number of codes generated by the entropy coding unit 1103.

The output unit 1105 outputs the codes generated by the code-number controlling/coding unit 1104 and the codes generated by the extracted-information coding unit 108.

<<Code Accumulation Unit 1101>>

The code accumulation unit 1101 accumulates the codes generated by the pre-process coding unit 102, and simultaneously adjusts the amount of entropy necessary for entropy coding by the entropy coding unit 1103. More specifically, the code accumulation unit 1101 calculates the generation probability of each code generated by the pre-process coding unit 102, and generates a frequency table indicating the relationship between each code and the probability of generation of it. The adjustment of the amount of entropy may be performed by the code generation unit 1102. In this case, the code generation unit 1102 generates the frequency table.

<<Code Generation Unit 1102>>

The code generation unit 1102 operates in the same manner as the code generation unit 104 of the first embodiment, but differs therefrom in the data supplied thereto. In modification 2 of the first embodiment, the code generation unit 1102 directly receives the codes generated by the pre-process coding unit 102.

As a result, the code generation unit 1102 generates a Huffman code word corresponding to the codes generated by the pre-process coding unit 102. At this time, since no process for limiting the number of code words is performed, the number of Huffman code words is still $2^{16}$ where the quantization bit length is 16 bits.

<<Entropy Coding Unit 1103>>

The entropy coding unit 1103 subjects the codes, generated by the pre-process coding unit 102, to entropy coding based on the code words generated by the code generation unit 1102. Also at this time, no process for limiting the number of code words is performed, therefore the number of code words is still $2^{16}$ where the quantization bit length is 16 bits.

<<Code-Number Controlling/Coding Unit 1104>>

The code-number controlling/coding unit 1104 codes those of the codes generated by the entropy coding unit 1103, which correspond to the code words generated by the code generation unit 1102 and limited as actually used ones.

Specifically, the code-number controlling/coding unit 1104 sets a limit to the code length (hereinafter referred to "the limited code length") for coding, and replaces the code words, which have code lengths longer than the limited code length, with codes different from them.

Assume here that the code-number controlling/coding unit 1104 sets the limited code length to N bits, and that a Huffman code word A' corresponding to a certain code A generated by the pre-process coding unit 102 is generated by the entropy coding unit 1103. If the code length M of the code word A' is not more than N, the code-number controlling/coding unit 1104 outputs the code word A'. In contrast, if M is larger than N, the unit 1104 employs the upper N bits of the code word A' as "non-coded identifier" (represented by, for example, "C"), and couples, to the non-coded identifier, symbol A corresponding to the word and generated by the pre-process coding unit 102, thereby outputting a code "CA". As a result, the number of code words is reduced to $2^N$ by the unit 1104.

Note that during decoding, if no corresponding decode word exists when the bits of a certain code are sequentially checked beginning with the leading bit, and the code length reaches the limited length, the upper N bits of the code can be regarded as a non-coded identifier. Accordingly, the 16-bit code subsequent to the certain code is considered the code A. Thus, the above coding method employed in the code-number controlling/coding unit 1104 can be regarded as a method capable of limiting the number of code words and facilitating decoding.

<<Output Unit 1105>>

The output unit 1105 operates in substantially the manner as the output unit 109 of the first embodiment. The output unit 1105 outputs, with respect to all data input to the input unit 101, 1) the computer graphics data codes generated by the code-number controlling/coding unit 1104, and 2) the codes for decoding generated by the extracted-information coding unit 108.

More effective coding can be realized by appropriately combining the first embodiment and modifications 1 and 2.

Modification 3 of the First Embodiment

In this modification, the pre-process coding unit 102 performs the following process (hereinafter referred to as "element compression"), in addition to the above-descried process.

<Element Compression>

Element compression is a compression method for utilizing the information that the length of a data vector (i.e., a group of data items) is 1, to reduce the amount of data corresponding to one element. Element compression is performed, for example, after normalization and before quantization.

<Condition for Element Compression>

If the following condition is satisfied, element compression can be performed. That is, the condition enabling element compression is that the data vector (a group of data items) is a normalized vector having a length of 1. If data is formed of N elements $(e_1, e_2, \ldots, e_n)$, the data that satisfies the following equation (7) is the data as a normalized vector having the length of 1:

$$\|(e_1, e_2, \ldots, e_n)\|=1$$

This equation is equal to $$(\Sigma e_k^2)^{1/2}=1 \quad (7)$$

In the case of, for example, vertex data, normalized normal data (nx, ny, nz) satisfies the above condition. Normalized normal data is data most probable in using element compression. Element compression will be described using normalized normal data as an example.

<Method of Element Compression>

Normalized normal data satisfies the equation (7). That is, $(nx^2+ny^2+nz^2)=1$ is established.

From this, the following equation (8) is established:

$$nz=\text{sign}(nz)\times(1-nx^2-ny^2)^{1/2} \quad (8)$$

where sign(nz) is the sign of nz, and if nz<0, a value of −1 is acquired, whereas if nz≧0, a value of +1 is acquired. From this, it can be understood that nz can be uniquely determined from nx, ny and sign(nz). The same can be said of nx and ny.

$$nx=\text{sign}(nx)\times(1-ny^2-nz^2)^{1/2} \quad (9)$$

$$ny=\text{sign}(ny)\times(1-nx^2-nz^2)^{1/2} \quad (10)$$

This means that the original three elements can be acquired if two elements are determined and the sign of the other element is determined. Utilizing this, element compression is performed in the manner as below:

nx, ny, nz→n1, n2, sign(n3)

where n1 and n2 are the values of the above-mentioned two of the three elements nx, ny and nz, sign(n3) is the sign of the other element.

<Selection of Element>

As the above-mentioned two elements, the lowest and second lowest values are selected from ‖nx‖, ‖ny‖ and ‖nz‖. This can minimize computation errors that may occur during decoding. During decoding, it is necessary to acquire information as to the two elements to be selected, therefore this information must be attached. In summary, nx, ny and nz can be subjected to the element compression as given by nx, ny, nz→n1, n2, p where p is a parameter for decoding represented by three bits as shown in FIG. 12.

For instance, in the case of data (nx, ny, nz)=(0.13, 0.99, −0.02), n1=nx
n2=nz
p=100

<Advantage of Element Compression>

The amount of data acquired by quantization performed after the above-described element compression is reduced from 48 bits (3×16-bit elements (nx, ny, nz)) to 35 bits (2×16-bit elements (n1, n2)+3 bits (p)).

<Process After Element Compression>

Concerning the 3-bit parameter p acquired by element compression, it is determined whether this value should be subjected to coding before the coding process by the code-number controlling/coding unit 103, or the value should be output as it is. The information indicating the selection is accumulated in the entropy-information accumulation unit 104, extracted by the extraction unit 107, and output from the output unit 109 via the extracted-information coding unit 108.

<In the Case where the Number of Elements is not Three>

Although in the above, normalized normal data having three elements is exemplified, other data can also be subjected to element compression.

For instance, in the case of two elements (e1, e2), it is sufficient if p is 2-bit data as shown in FIG. 13, and the compressed one of the two elements, i.e., e2, can be expanded by the following equation (11):

$$e2=\text{sign}(e2)\times(1-e1^2)^{1/2} \quad (11)$$

To process the two elements in the same manner as in the case where the number of elements is not two, p may be set as 3-bit data and formed of a value acquired by adding 0 to MSB.

Furthermore, in the case of four elements (e1, e2, e3, e4), 3 bits are necessary for p in the same manner as in the case of three elements. FIG. 13 shows the parameters in this case. Compressed element e4 is expanded by the following equation (12):

$$e4=\text{sign}(e4)\times(1-e1^2-e2^2-e3^2)^{1/2} \quad (12)$$

The same can be said of the case of five elements.

The above-described processes enhance the compression efficiency of data output from the pre-process coding unit 102, and are important since they directly contribute to the enhancement of the compression efficiency of the output code of modification 3.

Second Embodiment

Figures 14, 15:
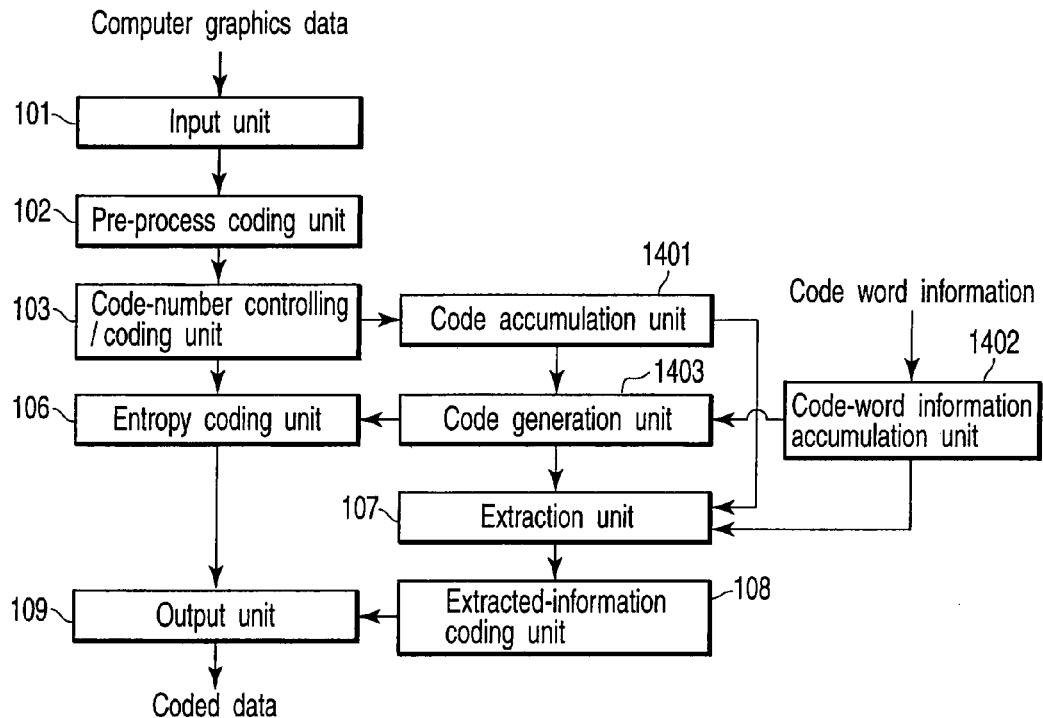
FIG. 14 is a block diagram illustrating a computer graphics data coding apparatus according to a second embodiment of the invention.
FIG. 15 is a table illustrating the generation frequency of Sz generated by the entropy information accumulation unit appearing in FIG. 14.

FIG. 14 is a block diagram illustrating the entire configuration of a computer graphics data coding apparatus according to a second embodiment. In FIGS. 1 and 14, like reference numerals denote like elements, and no detailed description will be given thereof.

As shown, the computer graphics data coding apparatus of the second embodiment comprises an input unit 101, pre-process coding unit 102, code-number controlling/coding unit 103, code accumulation unit 1401, code-word information accumulation unit 1402, code generation unit 1403, entropy coding unit 106, extraction unit 107, extracted-information coding unit 108 and output unit 109.

The code accumulation unit 1401 accumulates parts of the codes generated by the code-number controlling/coding unit 103, which are to be subjected to entropy coding.

The code-word information accumulation unit 1402 pre-accumulates information indicating the relationship between entropy information and code words in typical data.

The code generation unit 1403 generates code words corresponding to the codes generated by the code-number controlling/coding unit 103, based on the information accumulated in the code accumulation unit 1401 and code-word information accumulation unit 1402.

In the first embodiment, the entropy information accumulation unit 104 dynamically acquires entropy information from the codes generated by the code-number controlling/coding unit 103, and generates a code frequency table based on the acquired information.

In contrast, in the second embodiment, the code-word information accumulation unit 1402 pre-accumulates code-word information indicating the relationship between entropy information and code words in typical data, and the code generation unit 1403 generates a code frequency table using the entropy information acquired from the code-number controlling/coding unit 103 and accumulated in the code accumulation unit 1401.

<<Code Accumulation Unit 1401>>

The code accumulation unit 1401 extracts, from the codes generated by the code-number controlling/coding unit 103, parts to be subjected to entropy coding by the entropy coding unit 106, and accumulates them. The unit 1401 operates in manner similar to that of the entropy information accumulation unit 104 of the first embodiment. Only operations of the unit 1401 different from those of the unit 104 will be described below.

The code accumulation unit 1401 sequentially accumulates the Sz parts of the SzBIN codes generated by the code-number controlling/coding unit 103, and simultaneously adjusts the amount of entropy necessary for entropy coding by the entropy coding unit 106.

A description will be given of the operations of the unit 1401, using Huffman coding as a type of entropy coding, as in the first embodiment.

In Huffman coding, the amount of entropy for coding is information indicating the relationship between the codes generated by the code-number controlling/coding unit 103, and the frequency of generation of each code. While accumulating Sz codes, the code accumulation unit 1401 counts the frequency of generation of each Sz value. After finishing counting concerning all data, the code accumulation unit 1401 generates a frequency table. The frequency table illustrates the frequency of generation of each Sz value. As shown in FIG. 15, the code accumulation unit 1401 calculates the probability of generation of each Sz value (0 to 16) contained in data, and assigns indexes of, for example, 0, 1, 2, ... to the respective generation frequencies in the descending order of frequency.

In the example of FIG. 15, an Sz value of 0 is generated with the $5^{th}$ highest frequency, an Sz value of 1 is generated with the highest frequency, an Sz value of 2 is generated with the $2^{nd}$ highest frequency, ..., and an Sz value of 16 is generated with the $2^{nd}$ lowest frequency.

Concerning a parameter to be contained in an SzBIN code as mentioned above, the same value as the Sz value is used as the index value. In FIG. 15, the normalized value (scale) is used as such a parameter, and its index value is always 31.

<<Code-Word Information Accumulation Unit 1402>>

The code-word information accumulation unit 1402 pre-accumulates information indicating the relationship between entropy information and code words in typical data.

Huffman codes are used to assign a code word of a shorter length to data of a higher generation frequency. To this end, the code words assigned vary depending upon the distribution of generation frequencies of the codes of each data item. Because of this feature, code words strongly depend upon data, and their generation requires much time and effort. Further, it is necessary to reconstruct code words depending upon data, in one way or another during decoding, which increases the decoding cost. As described below, the second embodiment can overcome these problems.

The code-word information accumulation unit 1402 pre-accumulates information indicating the relationship between entropy information and code words in typical data, using knowledge concerning the relationship between the generation frequencies of Sz codes acquired from a large amount of computer graphics data, and code words generated using the data.

Specifically, the code-word information accumulation unit 1402 pre-accumulates several types of tables (hereinafter referred to as "the code tables") illustrating the relationship between generation frequencies of data and corresponding code words. FIG. 16 shows a code-table example.

In FIG. 16, code words of "00", "010", ... are assigned to indexes of the highest frequency (index=0), the $2^{nd}$ highest frequency (index=1), ..., respectively.

Figure 18:
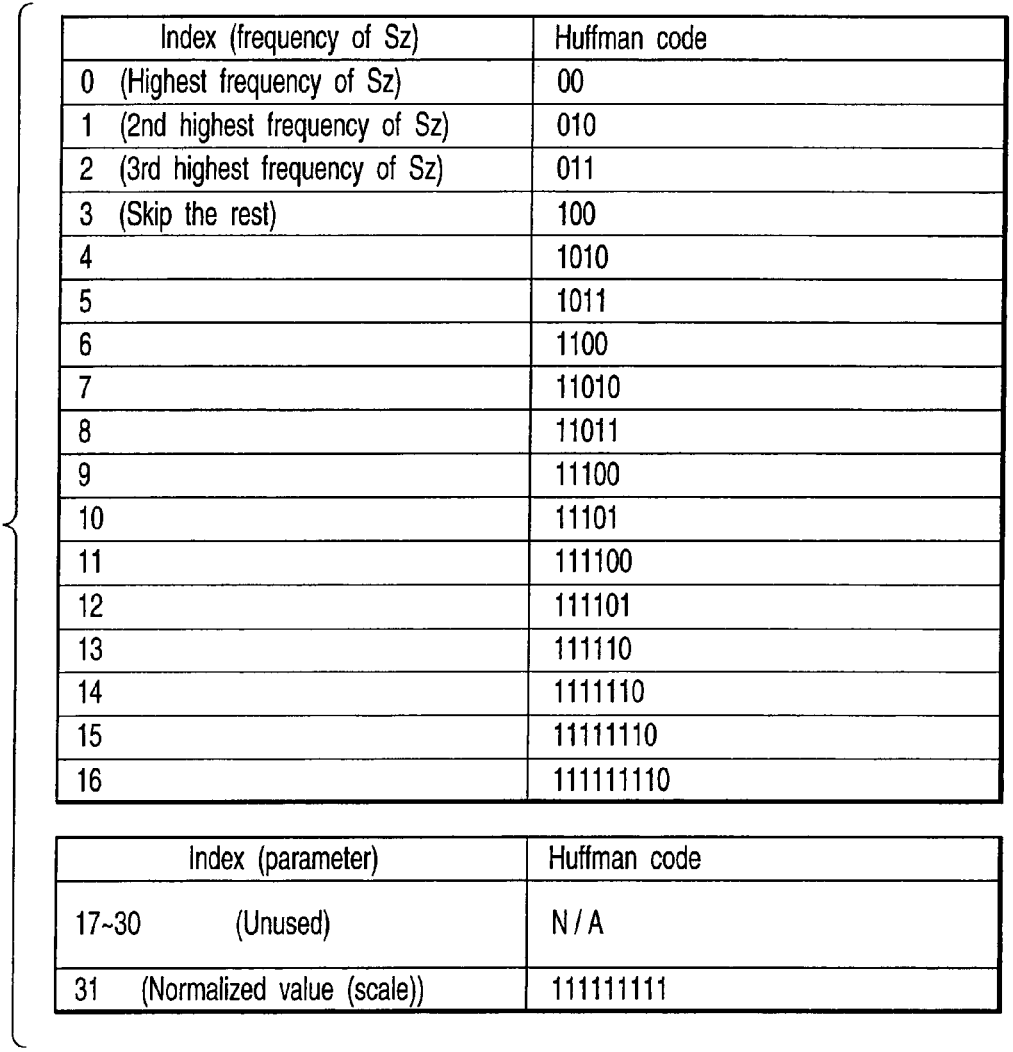
FIG. 18 is an example of a code table corresponding to computer graphics data indicating the states other than the state where the tops of, for example, spherical bodies are uniformly arranged.

It is practically known that in computer graphics data indicating a state in which the tops of, vertexes (for example, like a data of sphere) are uniformly arranged, the relationship between the order of generation frequencies and code words, shown in the table of FIG. 17, can provide a high compression effect. In the other computer graphics data, it is known that the relationship between the order of generation frequencies and code words, shown in the table of FIG. 18, can provide a high compression effect. Further, in FIGS. 17 and 18, similar code words are assigned to the normalized values (scales) as non-code words.

<<Code Generation Unit 1403>>

The code generation unit 1403 generates codes for entropy coding used by the entropy coding unit 106. When generating them, the unit 1403 utilizes the information accumulated in the code accumulation unit 1401 and code-word information accumulation unit 1402.

The code accumulation unit 1401 stores such a frequency table as shown in FIG. 15, which illustrates the relationship between the codes generated by the code-number controlling/coding unit 103, and the order of generation frequencies of the codes. Further, the code-word information accumulation unit 1402 stores such code tables as shown in FIG. 16, which illustrate the relationship between the generation frequencies of codes and typical code words corresponding thereto.

The code generation unit 1403 generates codes in the procedure as described below, using the above-mentioned frequency table and code table.

1. One is selected from the code tables stored in the code-word information accumulation unit 1402, and information indicating the selected code table is utilized by the extraction unit 107.

Figure 19:
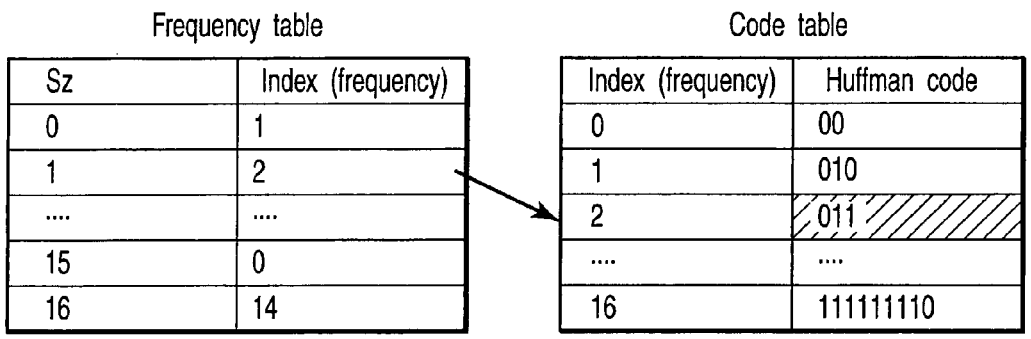
FIG. 19 is a view useful in explaining the operation of the code generation unit appearing in FIG. 14 to acquire a Huffman code with reference to the frequency table and code table.

2. Referring to the frequency table and code table, a Huffman code corresponding to an Sz value to be coded is determined. Specifically, as shown in FIG. 19, firstly, the frequency table is referred to, thereby acquiring the order of frequency (i.e., index) corresponding to the Sz value, and then the code table is referred to, thereby acquiring the code corresponding to the acquired order of frequency. The thus-acquired code word is used as a code word corresponding to the Sz value.

For instance, referring to FIG. 19, a description will be given of the case where a Huffman code corresponding to an Sz value of 1 is acquired. The code generation unit 1403 refers to the frequency table and temporarily stores the information indicating that the index value indicating the frequency of generation of the Sz value of 1 is 2. Subsequently, the code generation unit 1403 refers to the code table, thereby detecting that the Huffman code corresponding to the index value of 2 is "011", and outputting the Huffman code. Thus, the code generation unit 1403 generates the Huffman code of "011" corresponding to the Sz value of 1. In the above manner, the code generation unit 1403 generates the code word corresponding to each code generated by the code-number controlling/coding unit 103.

<<Extraction Unit 107>>

The extraction unit 107 extracts minimum information necessary for decoding from the entropy information used when the code generation unit 1403 generates the code words.

The minimum necessary information includes the following information items 1 and 2:

1. The relationship between codes and their generation frequencies, i.e., the frequency table generated by the code accumulation unit 1401; and 2. The information generated by the code-word information accumulation unit 1402 and indicating the selected code table.

The extraction unit 107 extracts the above information from the code generation unit 1403, code accumulation unit 1401 and code-word information accumulation unit 1402.

Advantage of the Second Embodiment

In the first embodiment, Huffman tree information or information indicating the relationship between data before coding and Huffman codes is necessary as decoding information (output from the extraction unit 107). In the coding process employed in the first embodiment, this information must be output as code data for all decoding information generated by the extraction unit 107.

In the second embodiment, since information concerning typical Huffman code words is prestored in the form of a code table in the code-word information accumulation unit 1402, it is sufficient if only frequency table information is output as decoding information (output from the extraction unit 107).

Accordingly, a greater amount of coding data can be reduced in the second embodiment than in the first embodiment. This leads to the enhancement of the throughput when data is input to a decoder.

Modification 1 of the Second Embodiment

The coding method used by the code-number controlling/coding unit 103 in modification 1 of the first embodiment is also applicable to the second embodiment.

Modification 2 of the Second Embodiment

The second embodiment can also be modified in the same manner as in modification 2 of the first embodiment.

Figure 20:
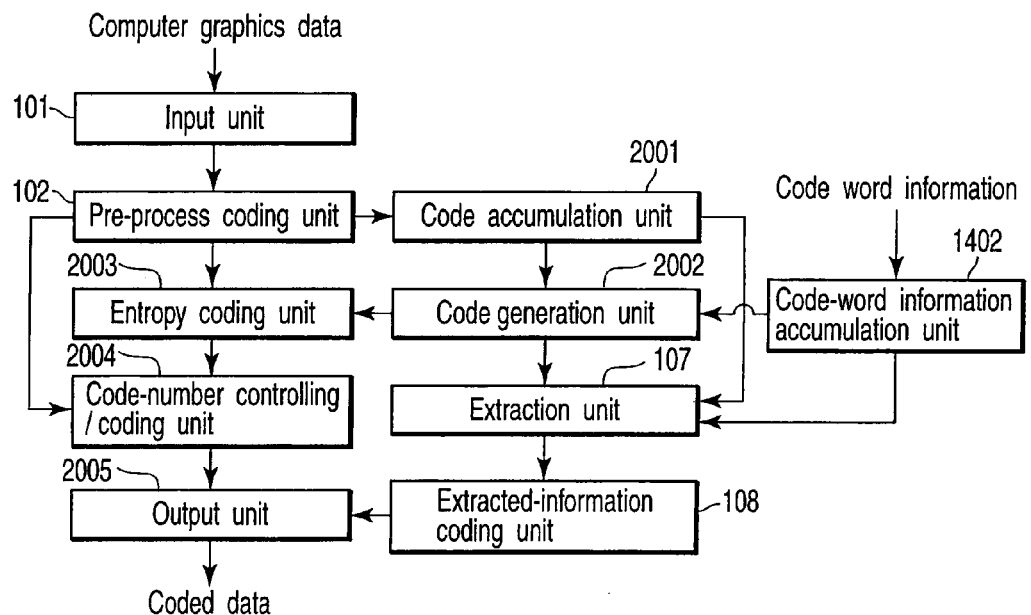
FIG. 20 is a block diagram illustrating a computer graphics data coding apparatus according to modification 2 of the second embodiment.

FIG. 20 shows the entire configuration of a computer graphics data coding apparatus according to modification 2 of the second embodiment. In FIGS. 1, 14 and 20, like reference numerals denote like elements, and no detailed description will be given thereof.

As shown, the computer graphics data coding apparatus according to modification 2 of the second embodiment comprises an input unit 101, pre-process coding unit 102, code accumulation unit 2001, code-word information accumulation unit 1402, code generation unit 2002, entropy coding unit 2003, code-number controlling/coding unit 2004, extraction unit 107, extracted-information coding unit 108 and output unit 2005.

The code accumulation unit 2001 accumulates the codes generated by the pre-process coding unit 102.

The code generation unit 2002 generates code words corresponding to the codes generated by the pre-process coding unit 102, based on the information stored in the code-word information accumulation unit 1402.

The entropy coding unit 2003 further codes the codes generated by the pre-process coding unit 102, using the code words generated by the code generation unit 2002.

The code-number controlling/coding unit 2004 codes the codes generated by the entropy coding unit 2003, thereby reducing the number of the codes.

The output unit 2005 outputs the codes generated by the code-number controlling/coding unit 2004 and the codes generated by the extracted-information coding unit 108.

<<Code Accumulation Unit 2001>>

The code accumulation unit 2001 is used to accumulate the codes generated by the pre-process coding unit 102, and to generate the above-mentioned frequency table. The code accumulation unit 2001 is similar in function to the code accumulation unit 1401 except that the codes input thereto are those generated by the pre-process coding unit 102.

<<Code Generation Unit 2002>>

The code generation unit 2002 is similar in operation to the code generation unit 1403 of the second embodiment, but differs therefrom in input data. Namely, in modification 2 of the second embodiment, the code generation unit 2002 directly receives the codes generated by the pre-process coding unit 102.

<<Entropy Coding Unit 2003>>

The entropy coding unit 2003 subjects the codes, generated by the pre-process coding unit 102, to entropy coding based on the code words generated by the code generation unit 2002.

<<Code-Number Controlling/Coding Unit 2004>>

The code-number controlling/coding unit 2004 codes those of the codes generated by the entropy coding unit 2003, which correspond to the code words generated by the code generation unit 2002 and limited as actually used ones. The unit 2004 operates in the same manner as the code-number controlling/coding unit 1104 employed in modification 2 of the first embodiment.

<<Output Unit 2005>>

The output unit 2005 operates in substantially the manner as the output unit 109 of the second embodiment. The output unit 2005 outputs, with respect to all data input to the input unit 101, 1) the computer graphics data codes generated by the code-number controlling/coding unit 2004, and 2) the codes for decoding generated by the extracted-information coding unit 108.

If the methods of the second embodiment and modifications 1 and 2 of the second embodiment are appropriately combined, further effective coding can be realized.

Furthermore, the element compression process performed in modification 3 of the first embodiment may be incorporated in the second embodiment.

Third Embodiment

A third embodiment of the invention is directed to a decoder for decoding the codes generated in the first embodiment.

Figure 21:
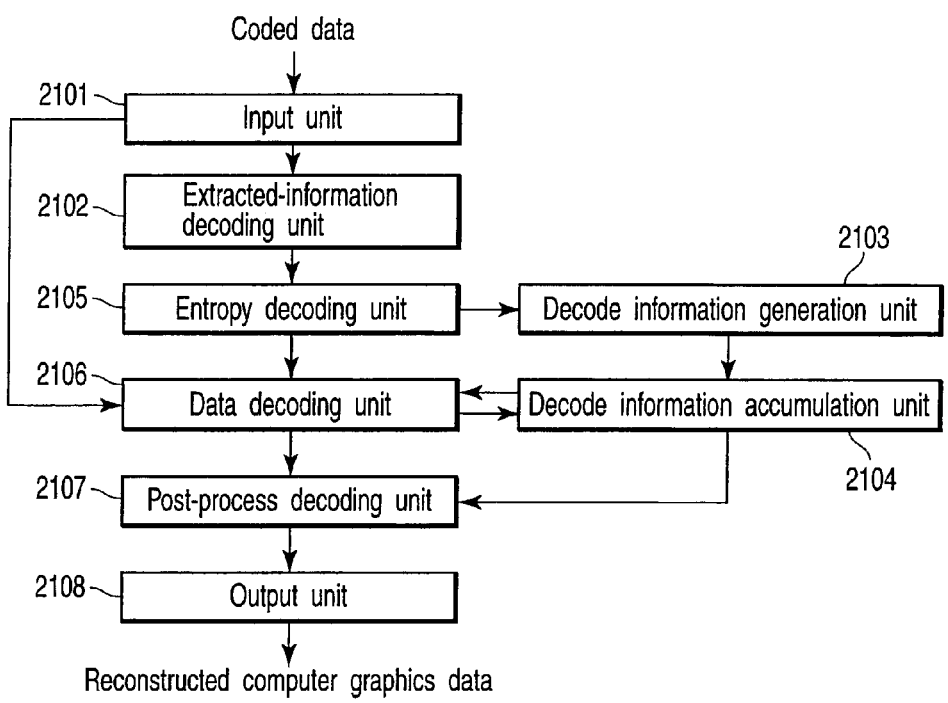
FIG. 21 is a block diagram illustrating a computer graphics data decoding apparatus according to a third embodiment of the invention.

FIG. 21 shows the entire configuration of a computer graphics data decoding apparatus according to the third embodiment of the invention.

As shown in FIG. 21, the computer graphics data decoding apparatus of the third embodiment comprises an input unit 2101, extracted-information decoding unit 2102, decode information generation unit 2103, decode information accumulation unit 2104, entropy decoding unit 2105, data decoding unit 2106, post-process decoding unit 2107 and output unit 2108.

The input unit 2101 acquires data coded by the method employed in the first embodiment.

The extracted-information decoding unit 2102 acquires, from the input unit 2101, parts of the codes generated by the extracted-information coding unit 108 of the first embodiment, and decodes them.

The decode information generation unit 2103 adds additional information for entropy decoding to the data generated by the extracted-information decoding unit 2102, thereby generating information for decoding code words.

The decode information accumulation unit 2104 accumulates the information for decoding generated by the decode information generation unit 2103.

The entropy decoding unit 2105 acquires, from the input unit 2101, parts of the codes generated by the entropy coding unit 106 of the first embodiment, and decodes them using the decode information accumulated in the decode information accumulation unit 2104.

The data decoding unit 2106 decodes the data generated by the entropy decoding unit 2105 into data corresponding to the data existing before the coding process by the code-number controlling/coding unit 103 of the first embodiment.

The post-process decoding unit 2107 performs inverse normalization, inverse quantization, etc., on the data generated by the data decoding unit 2106.

The output unit 2108 outputs the decoded data.

<<Input Unit 2101>>

The input unit 2101 acquires the code data generated by the computer graphics data coding apparatus of the first embodiment.

<<Extracted-Information Decoding Unit 2102>>

The extracted-information decoding unit 2102 acquires, from the input unit 2101, parts of the codes generated by the extracted-information coding unit 108 of the first embodiment, and decodes them.

The codes acquired are those generated by the extracted-information coding unit 108 of the first embodiment, and decoding is performed by the procedure opposite to that employed for coding by the extracted-information coding unit 108 of the first embodiment. The decoded data is returned to the data existing before the coding process by the extracted-information coding unit 108 of the first embodiment. The data decoded by the extracted-information decoding unit 2102 is, for example, Huffman tree information used by the code generation unit 105 of the first embodiment to generate code words.

<<Decode Information Generation Unit 2103>>

The decode information generation unit 2103 is used to add additional information for entropy decoding to the data generated by the extracted-information decoding unit 2102, thereby generating decode words for decoding code words. Specifically, the unit 2103 reconstructs the Huffman tree using the Huffman tree information generated by the extracted-information decoding unit 2102, and generates decode words by following the nodes of the tree from its root.

The decode information generation unit 2103 may hold the code words and decode words in the form of a table or in the form of the reconstructed Huffman tree. In the latter case, the entropy decoding unit 2105 performs decoding while dynamically searching the Huffman tree.

<<Decode Information Accumulation Unit 2104>>

The decode information accumulation unit 2104 is used to accumulate the information for decoding generated by the decode information generation unit 2103. Specifically, the unit 2104 may hold the reconstructed Huffman tree or a decode-word table based on the Huffman tree.

<<Entropy Decoding Unit 2105>>

The entropy decoding unit 2105 acquires, from the input unit 2101, parts of the codes generated by the entropy coding unit 106 of the first embodiment, and decodes them using the decode information accumulated in the decode information accumulation unit 2104. The inputs of the unit 2105 are codes of the Huff(Sz)BIN format. Namely, the inputs of the unit 2105 are codes acquired by subjecting the Sz parts of SzBIN codes to Huffman coding. The unit 2105 decodes the codes to return them to the SsBIN format.

Specifically, the entropy decoding unit 2105 searches each code, beginning with the first bit, for a decode word suitable for decode information (information indicating a Huffman code and the corresponding decode word) accumulated in the decode information accumulation unit 2104. The detected suitable decode word is a decoded Sz part. After that, the entropy decoding unit 2105 refers to the value of the Sz part and acquires the subsequent bits corresponding to the Sz value. The acquired bit sequence is a BIN code. If the acquired Sz value does not fall within an appropriate range (the appropriate range is, for example, from 0 to 16 when the quantization bit length is 16 bits), it is considered that the subsequent BIN part contains a non-code word. The non-code word is, for example, a normalized value (scale). In this case, the subsequent BIN part contains a normalized value represented in 32-bit floating-point representation. Any value other than a code, such as a normalized value (scale), is accumulated in the decode information accumulation unit 2104.

Referring to FIG. 22, a series of processes performed by the entropy decoding unit 2105 will be described.

Assume that the entropy decoding unit 2105 has detected "101" as a Huffman code, and its decode word is "01101". In this case, the decoded Sz value is "01101", i.e., Sz=13, therefore the subsequent 13-bit sequence is the BIN code part. Namely, in the example of FIG. 22, the BIN code is "0010110011101".

<<Data Decoding Unit 2106>>

The data decoding unit 2106 is used to decode the data generated by the entropy decoding unit 2105 into data corresponding to the data existing before the coding process by the code-number controlling/coding unit 103 of the first embodiment. Specifically, the data decoding unit 2106 decodes the BIN codes generated by the entropy decoding unit 2105, whereby the data before BIN coding is reconstructed.

To decode BIN codes, it is sufficient if the procedure opposite to that employed for BIN coding in the first embodiment is employed. That is, decoding is performed by the two steps described below.

(Step 1)

At step 1, the following is performed:

1.1. If MSB is 1, 0 as the inverse of 1 is attached as MSB; and 1.2. If MSB is 0, 1 as the inverse of 0 is added to the code, and then 1 as the inverse of 0 is attached as MSB.

This process will be described in detail, using 11'b10110011110 as a code example. In this example, since MSB is 1, 0 as the inverse of 1 is attached to MSB in accordance with step 1.1, thereby acquiring 12'b010110011110.

In contrast, when 13'b0010110011101 as another code example is decoded, since MSB is 0, firstly, 1 as the inverse of 0 is added to the code in accordance with step 1.2. As a result, the following code is acquired:

13'b0010110011101+1'b1=13'b0010110011110

After that, in accordance with step 1.2, 1 as the inverse of 0 is attached to MSB, thereby acquiring 14'b10010110011110.

(Step 2)

At step 2, the following is performed:

2.1. If MSB is 1, subsequent "1" bits are attached as the upper bits to the data acquired at step 1, thereby forming 16-bit data; and 2.2. If MSB is 0, subsequent "0" bits are attached as the upper bits to the data acquired at step 1, thereby forming 16-bit data.

Specifically, in the case of 12'b010110011110 acquired at step 1.1, since MSB is 0, four "0" bits are attached to form 16-bit data in accordance with step 2.2. As a result, the original code is decoded into 16'b0000010110011110, which is data represented in the 16-bit fixed-point format.

Further, in the case of 14'b10010110011110 acquired at step 1.2, since MSB is 1, two "1" bits are attached to form 16-bit data in accordance with step 2.1. As a result, the original code is decoded into 16'b1110010110011110, which is data represented in the 16-bit fixed-point format.

BIN-code decoding is completed by the above two steps, and decoded data in 16-bit fixed-point representation is acquired.

<Summary of Decoding>

In summary, the data decoding unit 2106 decodes a BIN code with a bit length of Sz into 16-bit fixed-point data by the following processing:

1. If MSB is 1 (i.e., if BIN[Sz−1]=1, where "BIN[n]" represents a value of the nth bit), the lower bits corresponding to Sz are used for the BIN code, and "0" is set in the upper remaining (16−Sz) bits; and 2. If MSB is 0 (i.e., if BIN[Sz−1]=0), the lower bits corresponding to Sz are used for the BIN code, then 16'b0000000000000001 is added, and "1" is set in the upper remaining (16−Sz) bits.

The above description concerns the case of using 16-bit fixed-point data as internal representation. When bits of an arbitrary size are mixed in internal representation, the operation of step 2 is not necessary.

<<Post-Process Decoding Unit 2107>>

The post-process decoding unit 2107 is used to perform inverse normalization, inverse quantization on the data decoded by the data decoding unit 2106 to reconstruct it. This process will be described in detail.

1. If the code data generated by the first embodiment is data acquired by performing first-order differential using the pre-process coding unit 102 of the first embodiment, first-order integral is performed. Namely, first-order integral given by $V_n = V_{n-1} + \Delta V_n$ (n=0, 1, 2, ... ) is performed.

2. Inverse quantization with respect to the quantization performed by the pre-process coding unit 102 of the first embodiment is performed on fixed-point data.

3. A normalized value is acquired from the decode information accumulation unit 2104, and is multiplied by the inverse quantization value acquired the above step 2.

4. The resultant data is the data existing before coding.

5. The above steps are performed on all elements of each data vector.

6. The above steps are performed on all vertexes (all vectors).

<<Output Unit 2108>>

The output unit 2108 is used to output the data decoded by the post-process decoding unit 2107, using the same format as that of the input data of the first embodiment.

The above-described computer graphics data decoding apparatus of the third embodiment can decode the data coded in the first embodiment.

Advantage of the Third Embodiment

In the third embodiment, the codes generated in the first embodiment, which are acquired by limiting the number of code words and their maximum length, are decoded. When generating decode words, it is not necessary to secure a large memory area for decode words, since the number of code words is limited. This differs from the prior art. Furthermore, the maximum length of code words is also limited, reduction of the throughput when decoding can be suppressed, which reduces the computation cost of the decoder, and the cost for realizing the decoder.

Modification 1 of the Third Embodiment

A decoder according to modification 1 of the third embodiment is provided for decoding the codes generated in modification 1 of the first embodiment.

Modification 1 of the third embodiment has the same configuration as the third embodiment, and differs therefrom only in the operation of the entropy decoding unit 2105. Modification 1 of the first embodiment is characterized in that each code is divided into two or more portions, and the resultant portions are further coded. Modification 1 of the third embodiment decodes the thus-obtained codes. Specifically, the entropy decoding unit 2105 sequentially decodes the data input thereto, and couples them in the same method as that used for division in modification 1 of the first embodiment.

For instance, assume that, in modification 1 of the first embodiment, a 16-bit code is divided into the upper 8-bit code A and lower 8-bit code B, these codes A and B are converted by Huffman coding into codes A' and B', and codes A' and B' are coupled into code C (C={A', B'}). In this case, the entropy decoding unit 2105 sequentially checks and decodes the data, beginning with its leading portion. Namely, the unit 2105 firstly decodes A' into A, and then decodes B' into B, thereby generating decoded data {A, B}.

Modification 2 of the Third Embodiment

A decoder according to modification 2 of the third embodiment is provided for decoding the codes generated in modification 2 of the first embodiment.

Modification 2 of the third embodiment has the same configuration as the third embodiment, and differs therefrom only in the operation of the entropy decoding unit 2105. Modification 2 of the first embodiment is characterized in that concerning data with a particular code length N or less, coding is performed using Huffman code words, whereas concerning data with code lengths longer than N, coding is performed using non-coded identifiers and non-coded data. Modification 2 of the third embodiment decodes the thus-obtained codes.

Specifically, the entropy decoding unit 2105 sequentially decodes the data input thereto. If the decoded data can be decoded, using the decode information accumulated in the decode information accumulation unit 2104 and having code lengths not longer than the particular length N, it is used as a decode word. In contrast, if the decoded data cannot be decoded, it can be regarded as a non-coded identifier, therefore the subsequent data is used as decoded data. When the quantization bit length is 16 bits, subsequent 16-bit data can be used as decoded data.

Note that where the methods of the first embodiment and modifications 1 and 2 of the first embodiment are appropriately combined for coding, the methods of the third embodiment and modifications 1 and 2 of the third embodiment must be combined appropriately for decoding.

Modification 3 of the Third Embodiment

A decoder according to modification 3 of the third embodiment is provided for decoding the codes subjected to element compression in modification 3 of the first embodiment.

Modification 3 of the third embodiment differs from the third embodiment in the operations of the entropy decoding unit 2105, data decoding unit 2106 and post-process decoding unit 2107.

<<Entropy Decoding Unit 2105 and Data Decoding Unit 2106>>

Firstly, information indicating whether parameter coding is performed when element compression is performed is acquired from the extracted-information decoding unit 2102. If parameter coding is performed, the entropy decoding unit 2105 and data decoding unit 2106 perform decoding as per normal. In contrast, if parameter coding is not performed, data corresponding the bit length (e.g., 3 bits) of each parameter is acquired and used as a decode word.

A description will now be given, using normalized normal data formed of three elements nx, ny and nz. As described in modification 3 of the first embodiment, the normalized normal data (nx, ny and nz) is converted by element compression into data (n1, n2 and p) using the table of FIG. 12. This normalized normal data is coded in the form of {SzBIN(n1), SzBIN(n2), SzBIN(p)} or {SzBIN(n1), SzBIN(n2), p}. SzBIN(x) indicates a BIN code acquired by subjecting data x to BIN coding. When this code is decoded by the above-described decoding method, {n1, n2, p} is acquired.

<<Post-Process Decoding Unit 2107>>

The post-process decoding unit 2107 reconstructs data subjected to element compression, based on the above-acquired set of data and element-compression parameter. Reconstruction of, for example, data (nx, ny, nz) from data (n1, n2, p) will be described.

Firstly, the codes corresponding to n1 and n2 are subjected to inverse quantization and inverse normalization as per normal.

Subsequently, n3 is computed using the following equation (13) and the table of FIG. 12 for coding.

$$n3 = \text{sign}(n3) \times (1 - n1^2 - n2^2)^{1/2} \quad (13)$$

where sign(n3) is a function that assumes a value of 1 if the sign of the remaining one element is positive (i.e., the least significant bit (LSB) of p is 0), and assumes a value of −1 if the sign of the remaining one element is negative (i.e., LSB of p is 1), as can be understood from FIG. 12.

If the value $(1-n1^2-n2^2)$, whose square root is used in equation (13), is a negative value, it is set to 0. Namely, $$\text{if } 1-n1^2-n2^2 < 0, \text{ then } 1-n1^2-n2^2 = 0 \quad (14)$$

Further, referring to FIG. 23, data (n1, n2, n3) is converted into data (nx, ny, nz). The table of FIG. 23 is acquired by modifying the table of FIG. 12 for inverse conversion.

Specifically, when n1=0.02, n2=0.13 and p=011,
nx=n3=−1×(1−0.02²−0.013²)^{1/2}=−0.99,
ny=n1=0.02,
nz=n2=0.13.
This is the end of element expansion.

Although in the third embodiment and its modifications, normalized normal data is used, other type of data may be used. Further, the number of elements is not limited to three.

Fourth Embodiment

A computer graphics data decoding apparatus according to a fourth embodiment of the invention will be described. The decoding apparatus of the fourth embodiment is used to decode the codes generated in the second embodiment.

Figures 24, 25:
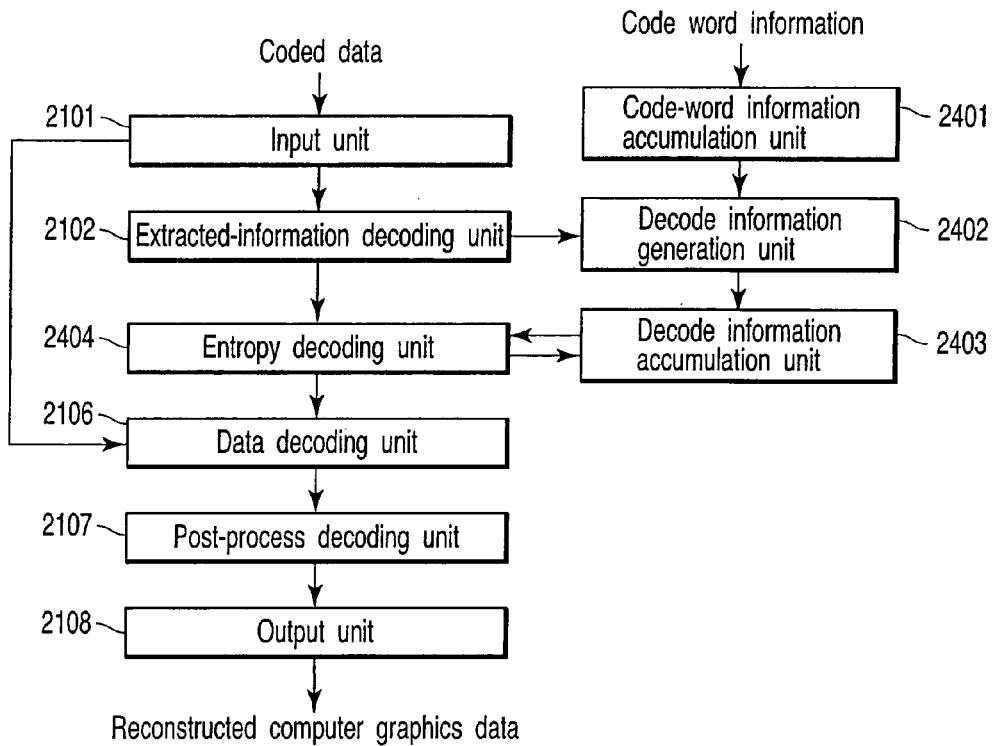
FIG. 24 is a block diagram illustrating a computer graphics data decoding apparatus according to a fourth embodiment of the invention.
FIG. 25 is a view useful in explaining how the decoded-data generation unit appearing in FIG. 24 acquires a decode word (Sz value) referring to a Huffman-code table and frequency table.

FIG. 24 shows the entire configuration of the decoding apparatus. In FIGS. 24 and 21 showing the fourth and third embodiments, respectively, like reference numerals denote like elements, and no detailed description will be given thereof.

As shown, the computer graphics data decoding apparatus of the fourth embodiment comprises an input unit 2101, extracted-information decoding unit 2102, code-word information accumulation unit 2401, decode information generation unit 2402, decode information accumulation unit 2403, entropy decoding unit 2404, data decoding unit 2106, post-process decoding unit 2107 and output unit 2108.

The code-word information accumulation unit 2401 pre-accumulates information indicating the relationship between entropy information and code words in typical data.

The decode information generation unit 2402 generates information for decoding code words, using the data generated by the extracted-information decoding unit 2102 and the information accumulated in the code-word information accumulation unit 2401.

The decode information accumulation unit 2403 accumulates the information for decoding generated by the decode information generation unit 2402.

The entropy decoding unit 2404 acquires, from the input unit 2101, the code parts generated by the entropy coding unit 106 of the first embodiment, and decodes them using the decode information accumulated in the decode information accumulation unit 2403.

<<Code-Word Information Accumulation Unit 2401>>

The code-word information accumulation unit 2401 pre-accumulates information indicating the relationship between entropy information and code words in typical data. Specifically, the unit 2401 stores the code table (FIGS. 16 to 18) employed in the second embodiment, as the same data as in the second embodiment.

<<Decode Information Generation Unit 2402>>

The decode information generation unit 2402 adds additional information for entropy decoding to the data generated by the extracted-information decoding unit 2102, using the information generated by the code-word information accumulation unit 2401, thereby generating decode words for decoding code words.

Specifically, the extracted-information decoding unit 2102 decodes the frequency table (FIG. 15) generated in the second embodiment, and generates it to the decode information generation unit 2402. Using this frequency table and the code table acquired from the code-word information accumulation unit 2401, the decode information generation unit 2402 generates decode words. Referring to the two tables as shown in FIG. 25, the unit 2402 generates decode words (Sz values) corresponding to the Huffman code words.

<<Decode Information Accumulation Unit 2403>>

The decode information accumulation unit 2403 is used to hold the information for decoding generated by the decode information generation unit 2402. More specifically, the unit 2403 holds decode words corresponding to the above-described Huffman codes.

<<Entropy Decoding Unit 2404>>

The entropy decoding unit 2404 is used to acquire, from the input unit 2101, the code parts generated by the entropy coding unit 106 of the first embodiment, and to decode them using the decode words accumulated in the decode information accumulation unit 2403.

The entropy decoding unit 2404 receives codes having the Huff(Sz)BIN format. The codes having the Huff(Sz)BIN format are acquired by subjecting the Sz parts of SzBIN codes to Huffman coding. The entropy decoding unit 2404 decodes codes having the Huff(Sz)BIN format, thereby returning them to SzBIN codes.

Specifically, the entropy decoding unit 2404 sequentially searches codes for decode words that match the Huffman codes accumulated in the decode information accumulation unit 2403. The searched decode words are the decoded Sz data. Thereafter, referring to the Sz values, the BIN codes are decoded, which is the same process as in the third embodiment.

Concerning the matters other than the above, the same operations as in the third embodiment are performed. The fourth embodiment can decode the code data generated in the second embodiment.

Advantages of the Fourth Embodiment

The third embodiment requires Huffman tree information or information indicating the relationship between data before coding and Huffman codes, as information necessary for decoding (the information generated by the extraction unit 107 during coding). When Huffman tree information is received, to generate decode words, it is necessary to reconstruct the Huffman tree. On the other hand, in the case of the information indicating the relationship between data before coding and Huffman codes, a relatively large amount of data must be received.

In contrast, in the fourth embodiment, since the code-word information accumulation unit 2401 prestores information concerning typical Huffman code words in the form of a table, it is sufficient if the information indicating the frequency table is received as the information necessary for decoding (the information generated by the extraction unit 107 during coding). Thus, the effect of reducing the required amount of code data is higher than in the third embodiment, which leads to the enhancement of the throughput when data is input to the decoder.

Furthermore, since decode words can be generated simply by receiving the frequency table and referring to it and to the prestored code table, the decoder of the fourth embodiment can be constructed more simply than that of the third embodiment, which needs to reconstruct the Huffman tree. This leads to the reduction of the costs.

In the conventional methods represented by the extended Huffman method for use in facsimile, decoders must have a fixed table indicating the relationship between data and decode words to reduce the computation and manufacturing costs of the decoders. This significantly reduces the compression efficiency by coding concerning data other than typical data.

In contrast, in the method of the fourth embodiment, only typical decode word data is pre-accumulated in the code-word information accumulation unit 2401, and frequency information is acquired from each data item. Accordingly, even if the tendency of data is changed, a high compression efficiency can be always realized by coding. The fourth embodiment is a combination of advantageous portions of the prior art and the third embodiment.

Modification 1 of the Fourth Embodiment

Modification 1 of the fourth embodiment differs from the fourth embodiment only in the operation of the entropy decoding unit 2404. In this case, the entropy decoding unit 2404 operates in the same manner as that employed in modification 1 of the third embodiment. Accordingly, the decoder of modification 1 of the fourth embodiment can decode the codes generated in modification 1 of the second embodiment.

Modification 2 of the Fourth Embodiment

Modification 2 of the fourth embodiment differs from the fourth embodiment only in the operation of the entropy decoding unit 2404. In this case, the entropy decoding unit 2404 operates in the same manner as that employed in modification 2 of the third embodiment. Accordingly, the decoder of modification 2 of the fourth embodiment can decode the codes generated in modification 2 of the second embodiment.

Note that where the methods of the first embodiment and modifications 1 and 2 of the first embodiment are appropriately combined, the methods of the fourth embodiment and modifications 1 and 2 of the fourth embodiment must be accordingly combined for decoding.

Further, to expand element-compressed data, the same process as in modification 3 of the third embodiment may be performed in modification 2 of the fourth embodiment.

The flowcharts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system for coding graphics data comprising:
an input unit configured to input a plurality of computer graphics data items each of which includes a 3-dimensional vector or a 4-dimensional vector for indicating positional data;
a pre-process unit configured to pre-process the inputted computer graphics data items;

a code-number controlling/coding unit configured to subject the pre-processed computer graphics data items to a process for controlling number of codes to be finally output, to generate a plurality of codes;

an accumulation unit configured to accumulate a plurality of parts to be subjected to entropy coding, which are contained in the generated codes;

a calculation unit configured to calculate entropy information based on the accumulated parts, and generate a plurality of code words based on the entropy information, the entropy information indicating an amount of entropy;

an entropy coding unit configured to subject the generated codes to entropy coding based on the generated code words, to generate a plurality of entropy codes;

an extraction unit configured to extract, from the entropy information, minimum information for decoding;

an extracted-information coding unit configured to code the minimum information in order to reduce an amount of the minimum information; and an output unit configured to output the entropy codes and the coded minimum information.

* * * * *